D. W. SHIEK.
CALCULATING MACHINE.
APPLICATION FILED DEC. 10, 1901.
1,143,920.
Patented June 22, 1915.
26 SHEETS—SHEET 4.
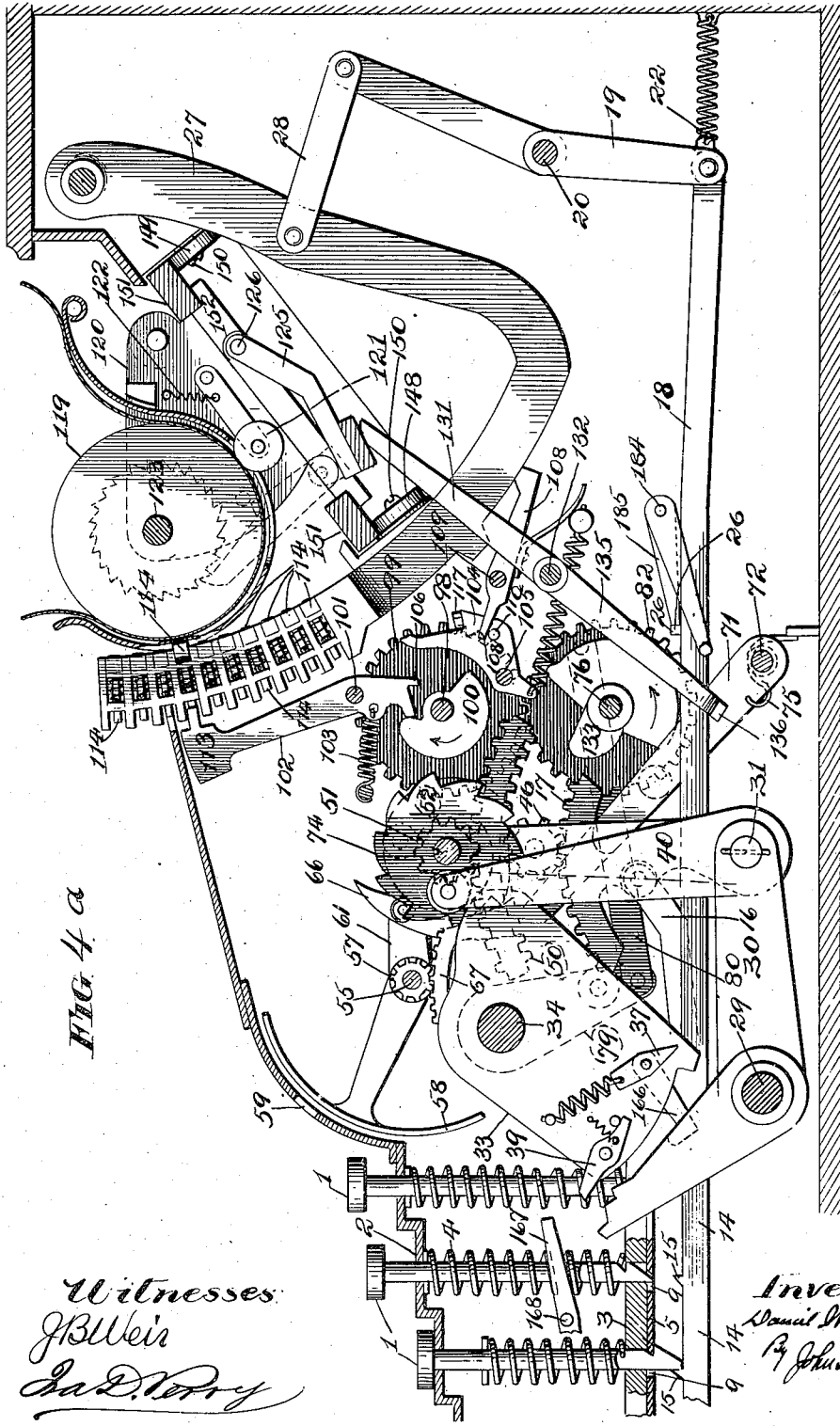

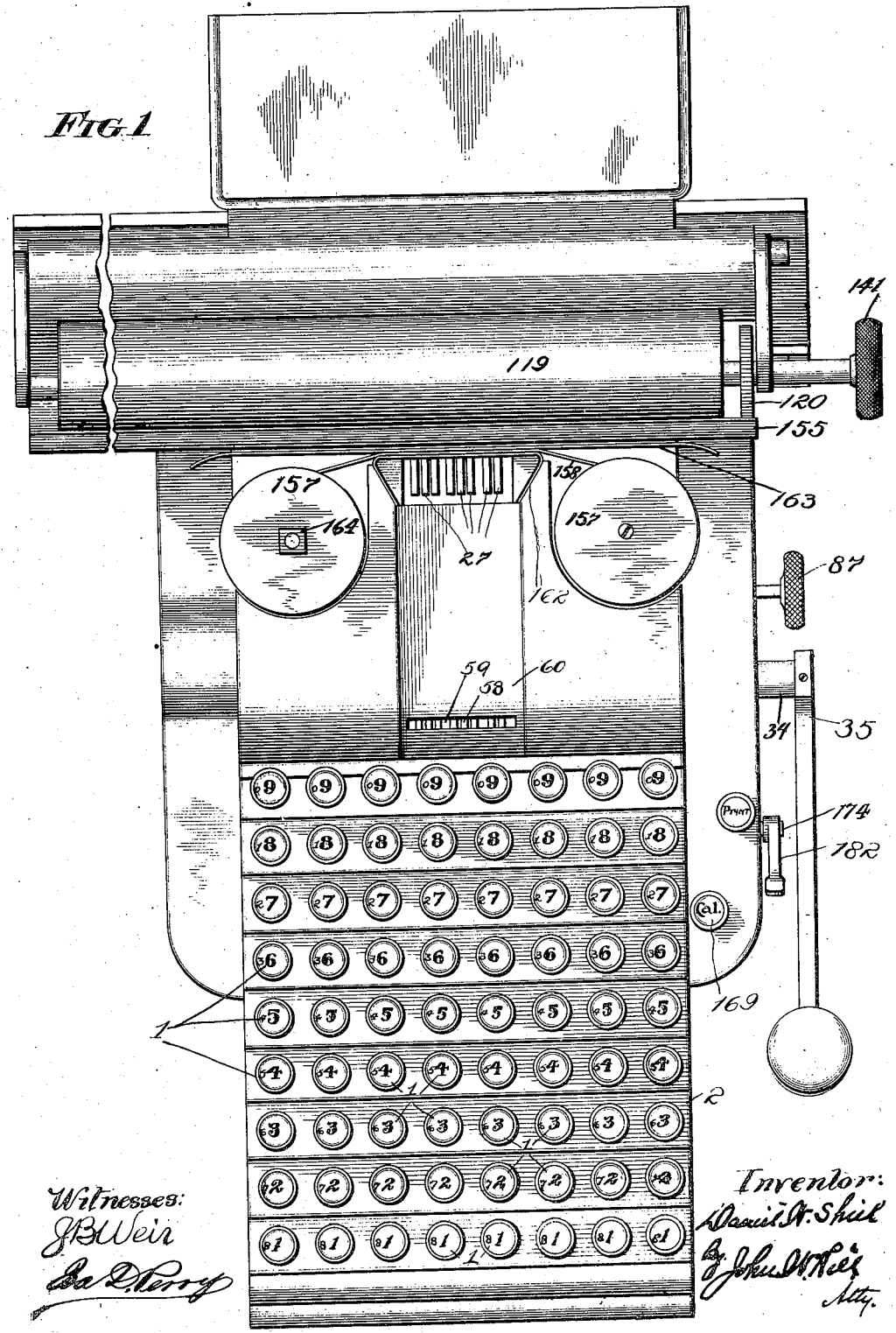

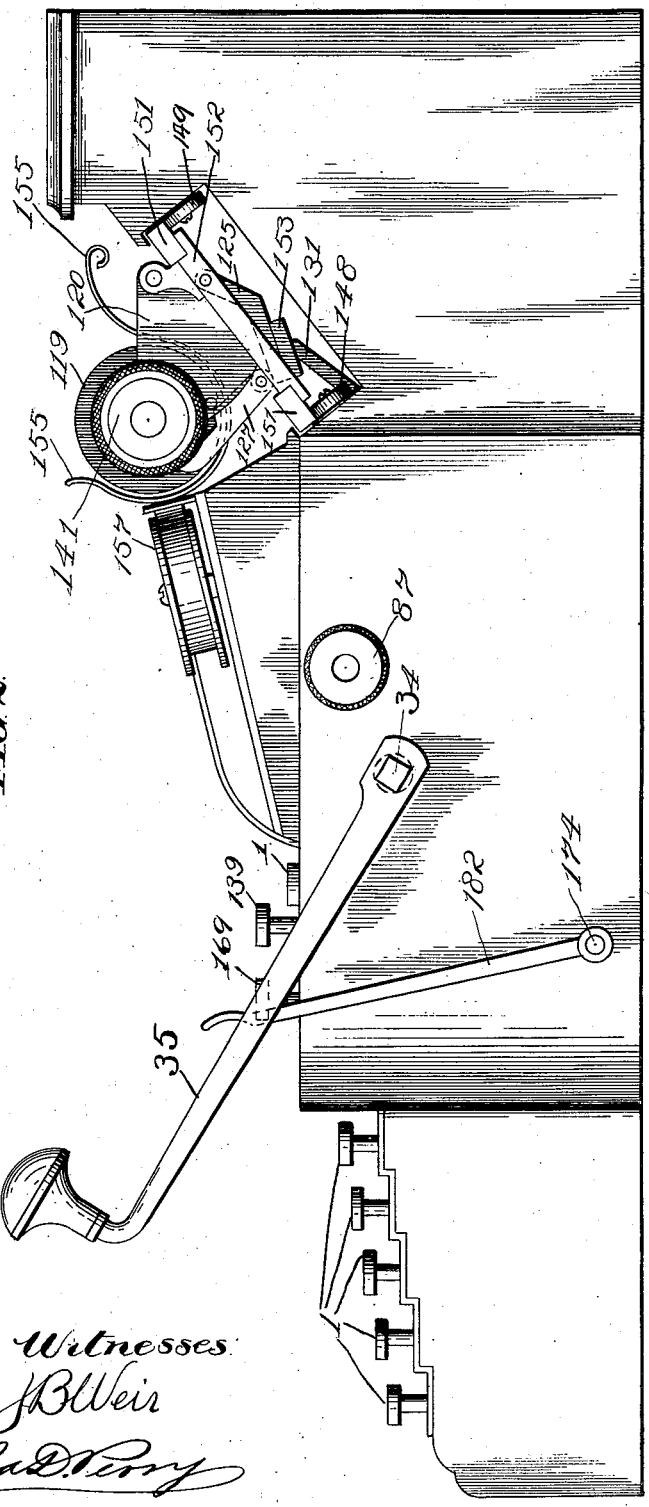

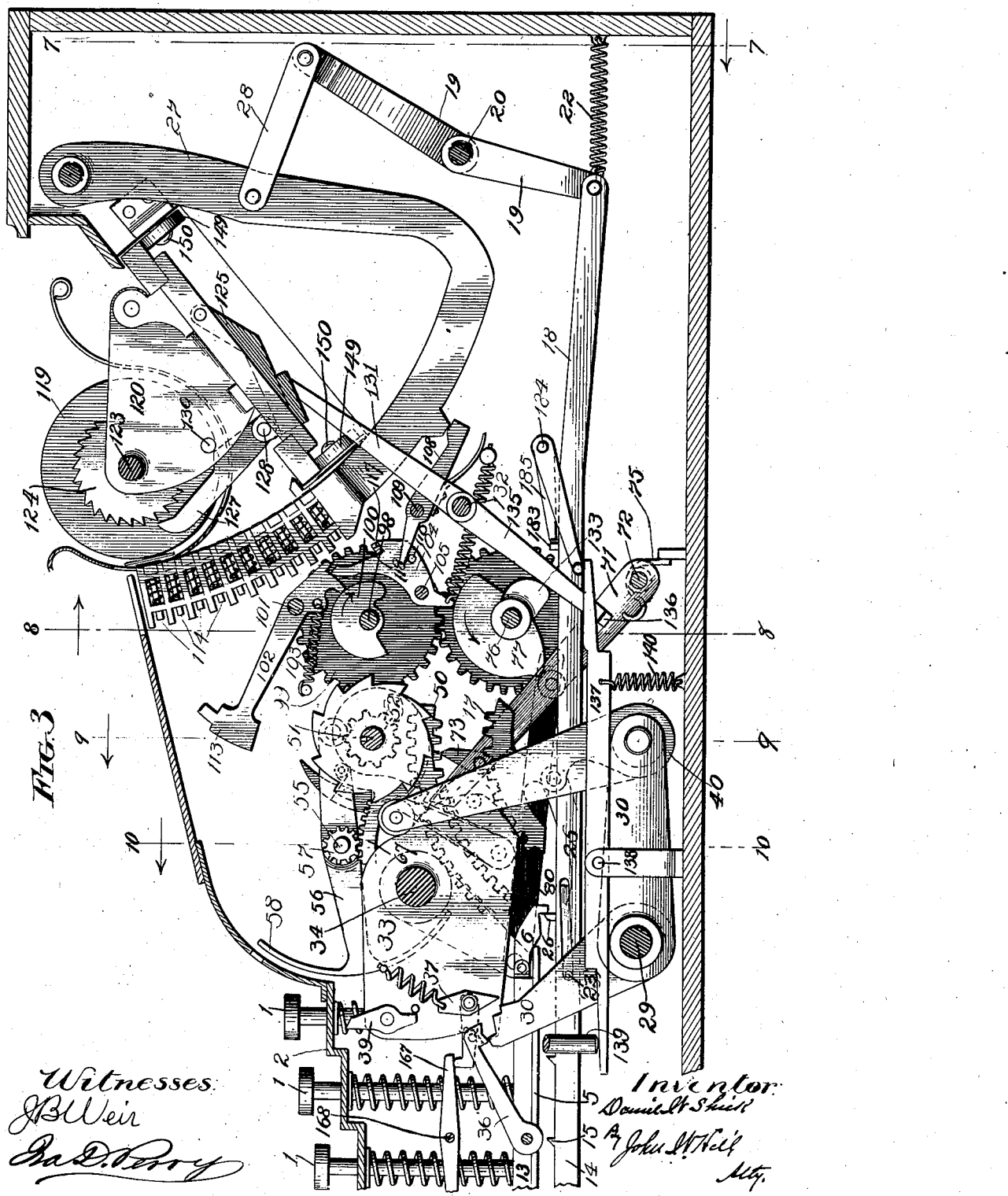

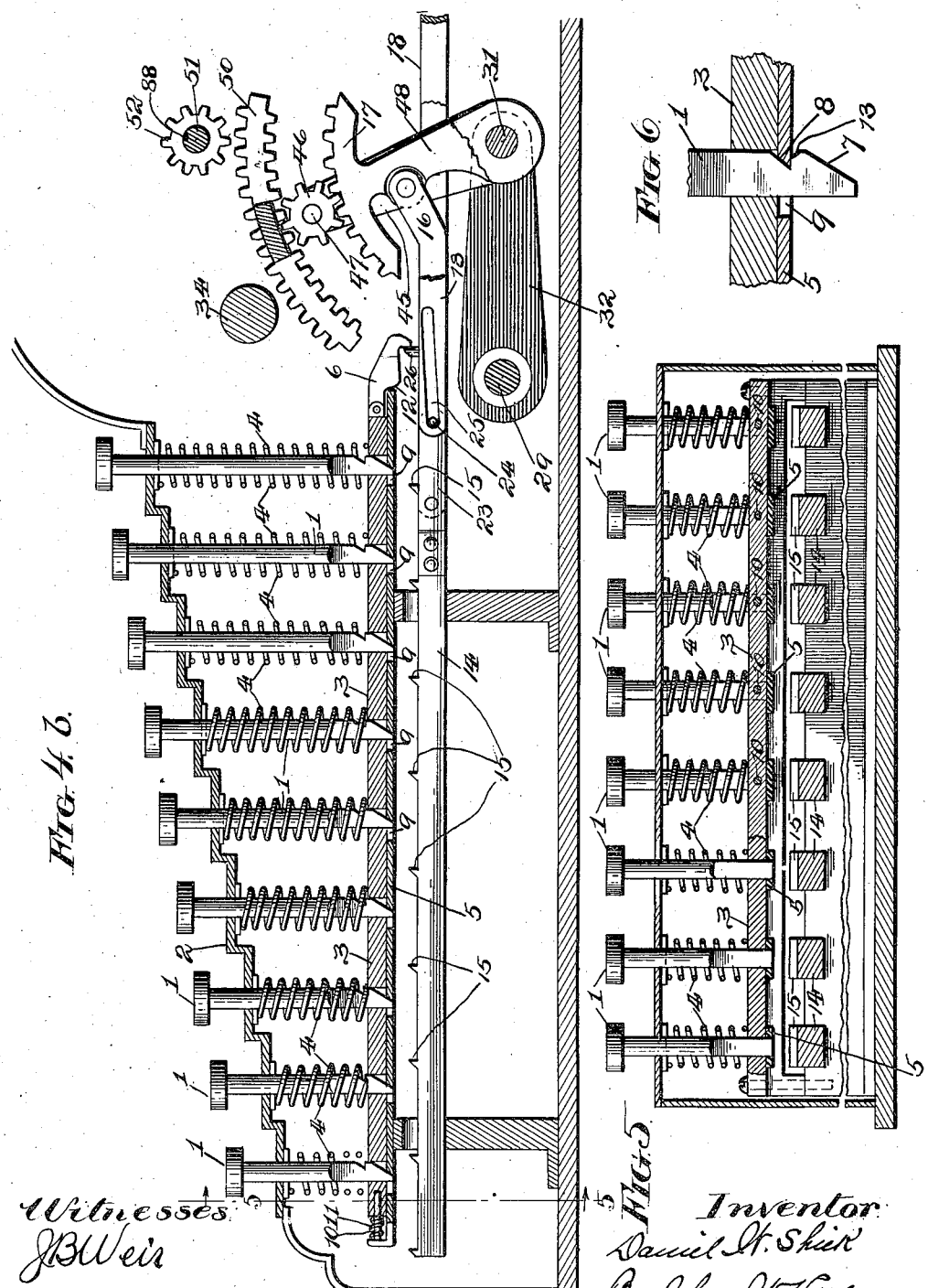

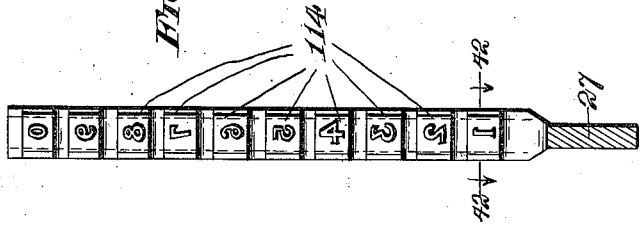
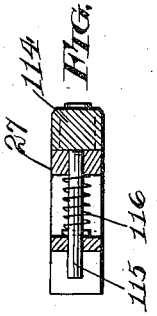
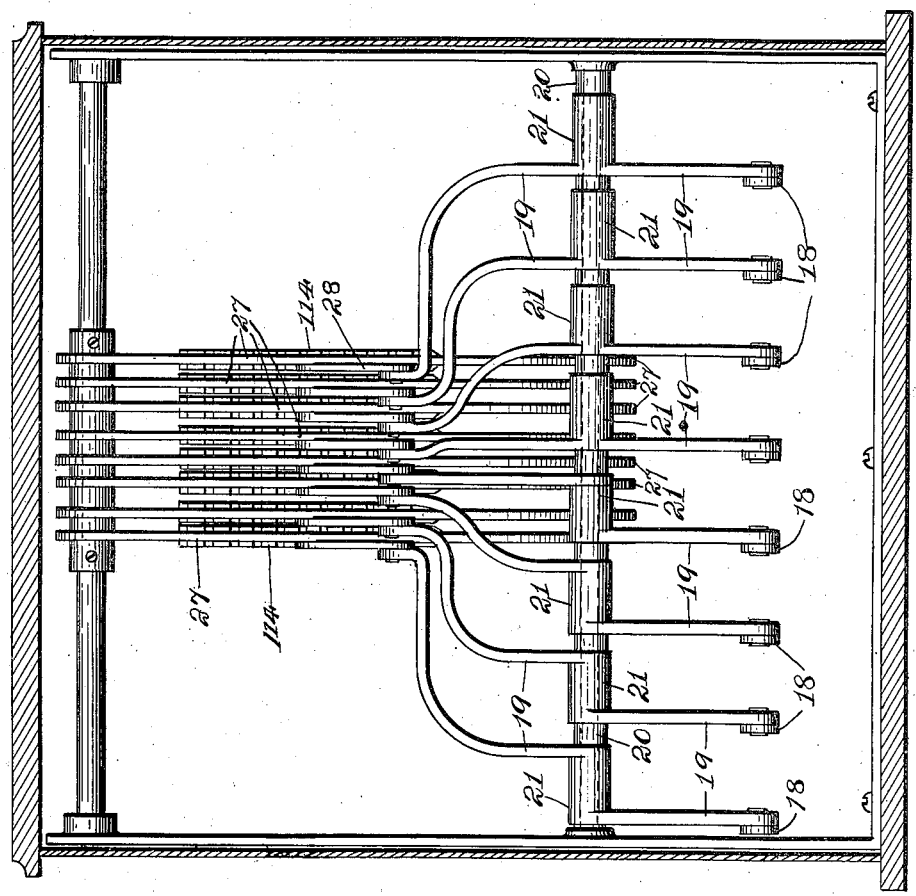

D. W. SHIEK.
CALCULATING MACHINE.
APPLICATION FILED DEC. 10, 1901.

1,143,920.

Patented June 22, 1915.
26 SHEETS—SHEET 7.

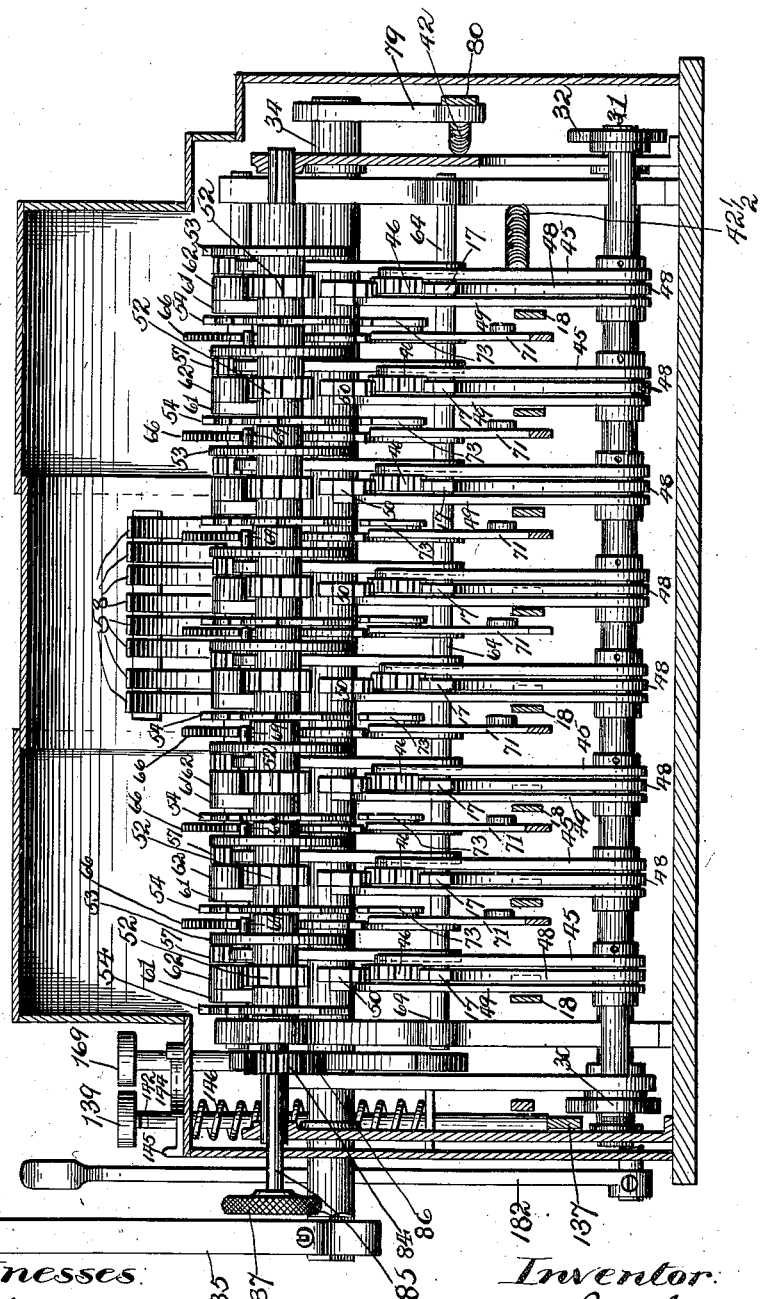

D. W. SHIEK.
CALCULATING MACHINE.
APPLICATION FILED DEC. 10, 1901.
1,143,920.
Patented June 22, 1915.
26 SHEETS—SHEET 9.
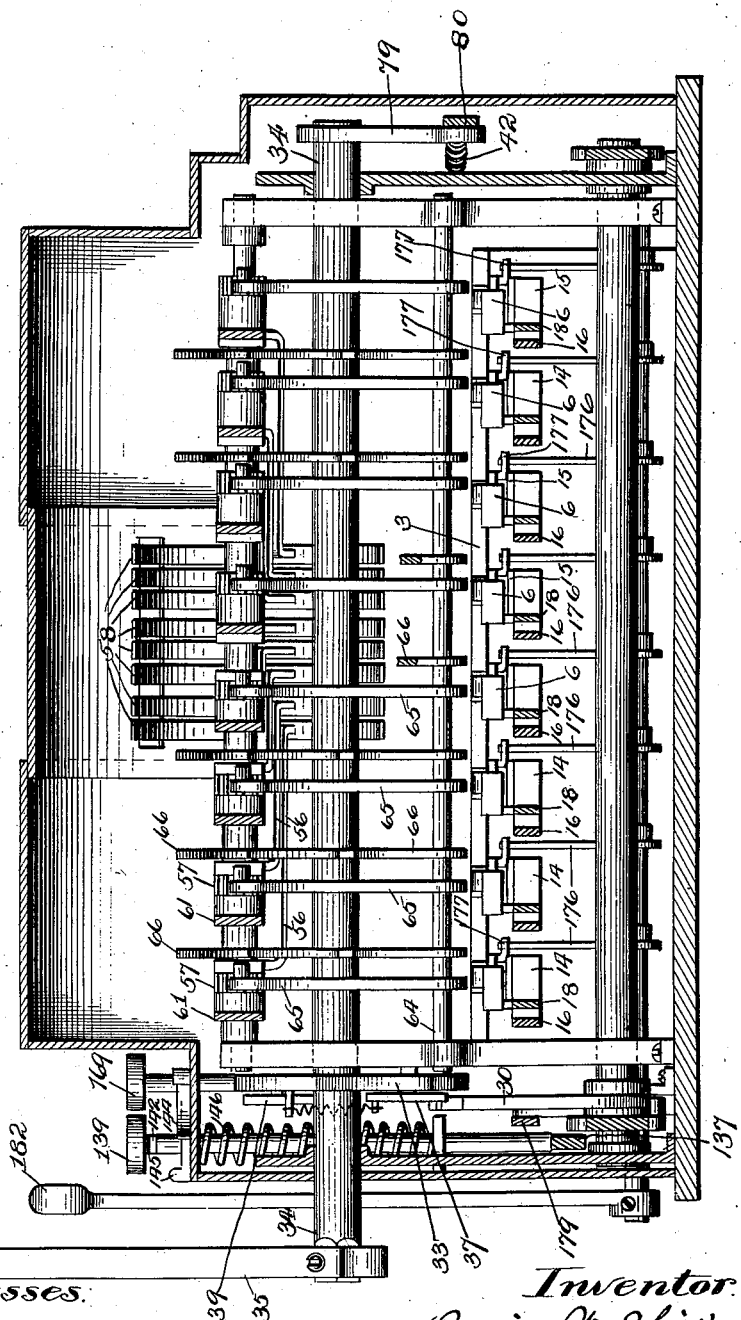

D. W. SHIEK.
CALCULATING MACHINE.
APPLICATION FILED DEC. 10, 1901.
1,143,920.
Patented June 22, 1915.
26 SHEETS—SHEET 10.
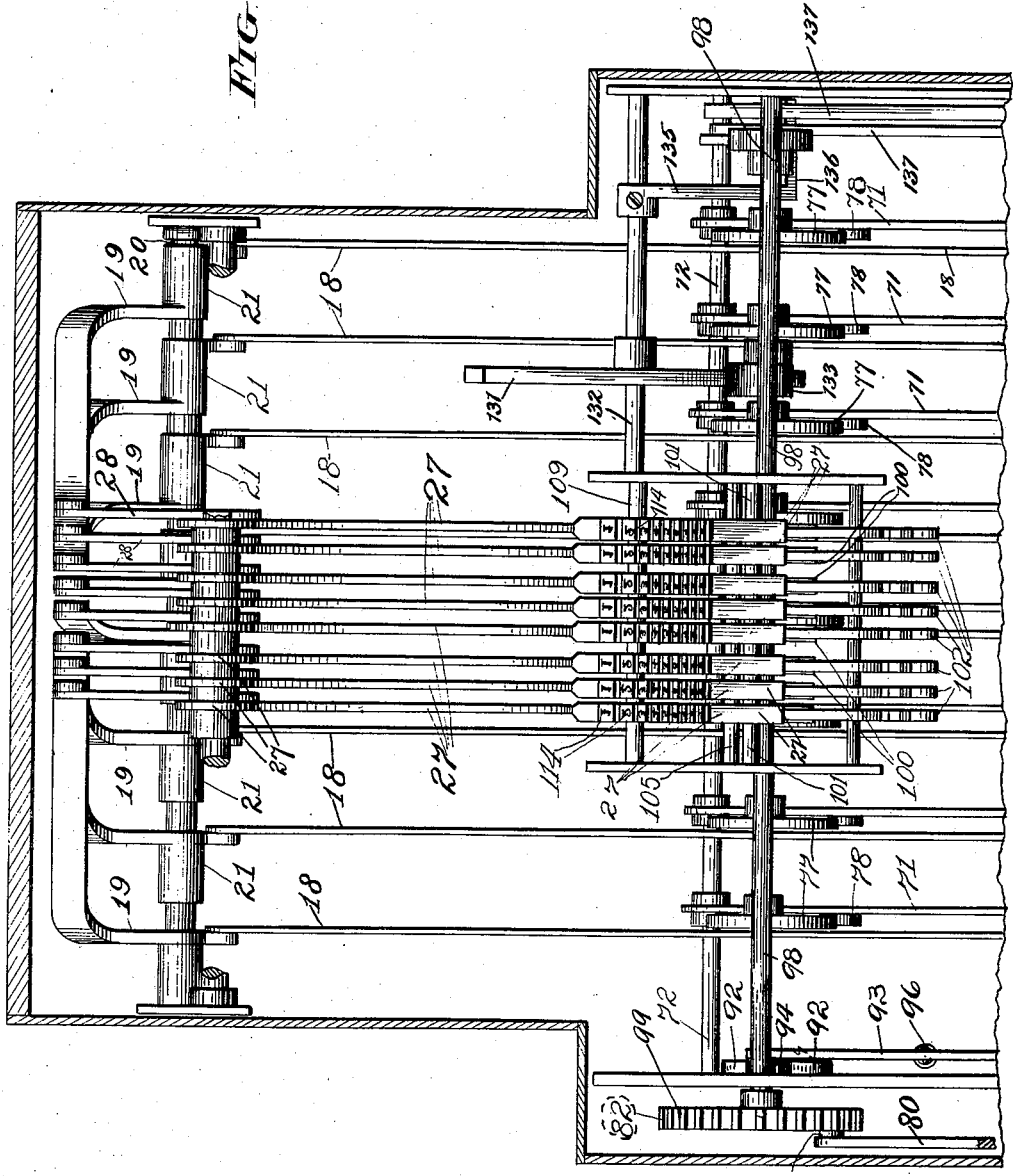

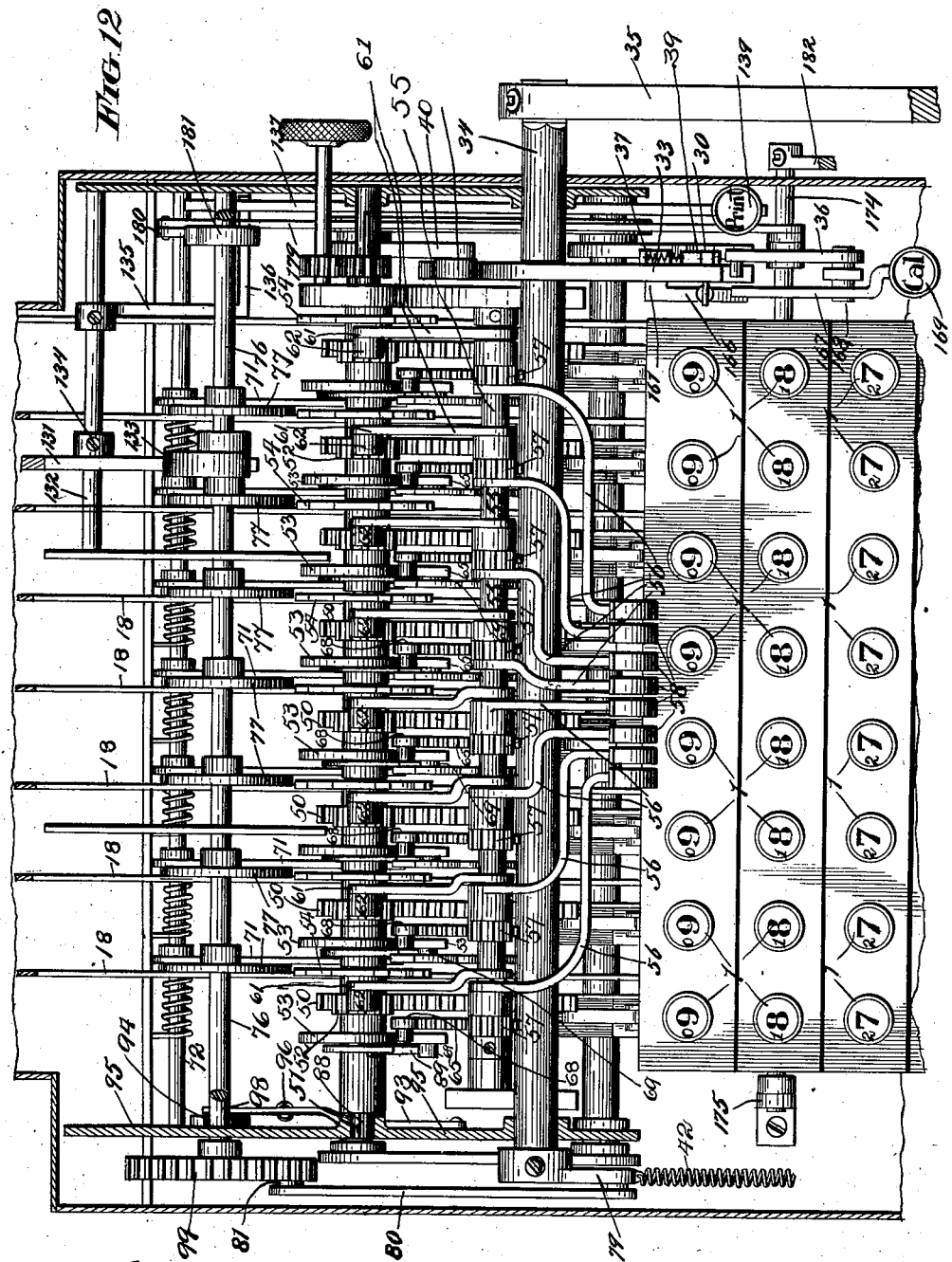

D. W. SHIEK.
CALCULATING MACHINE.
APPLICATION FILED DEC. 10, 1901.
1,143,920.
Patented June 22, 1915.
26 SHEETS—SHEET 12.
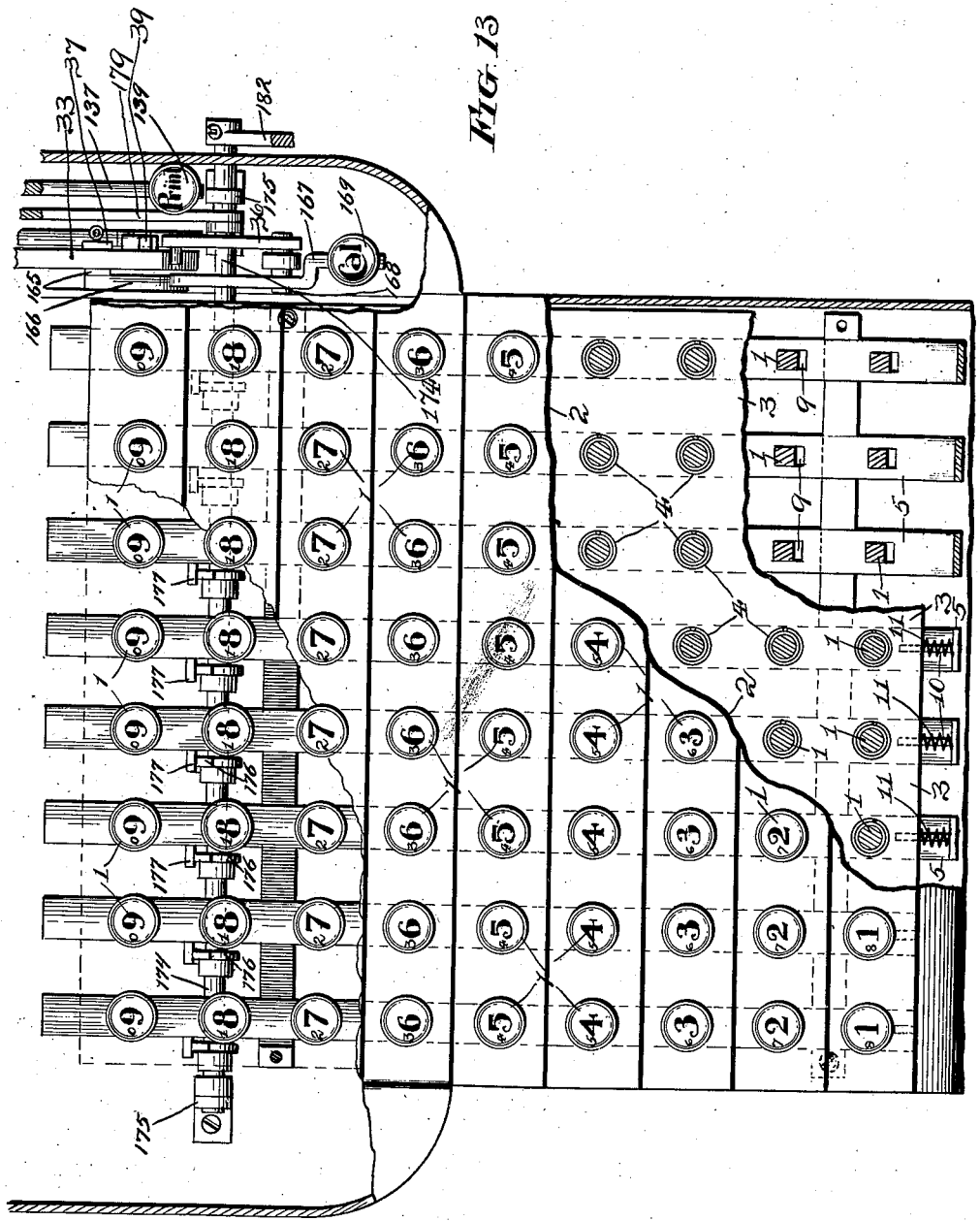

D. W. SHIEK.
CALCULATING MACHINE.
APPLICATION FILED DEC. 10, 1901.
1,143,920.
Patented June 22, 1915.
26 SHEETS—SHEET 13.
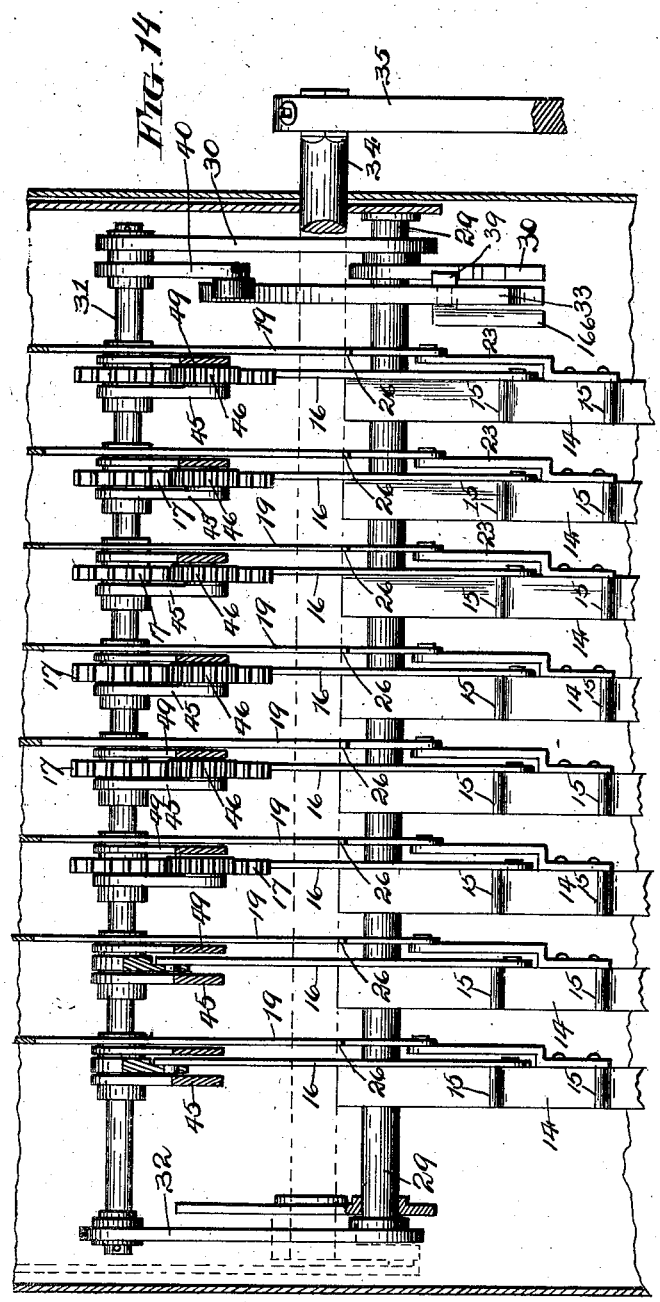

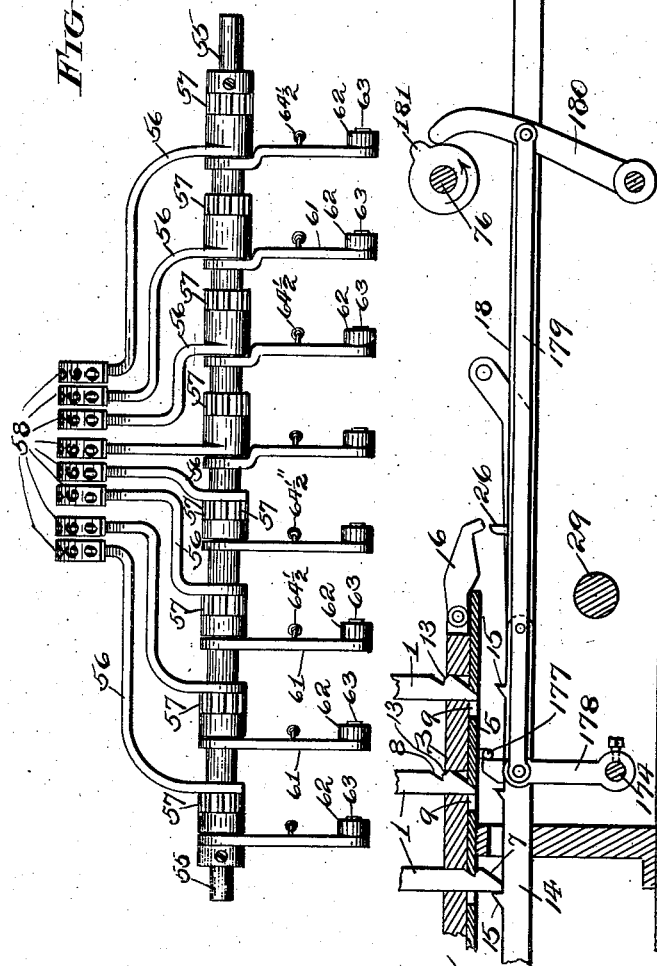
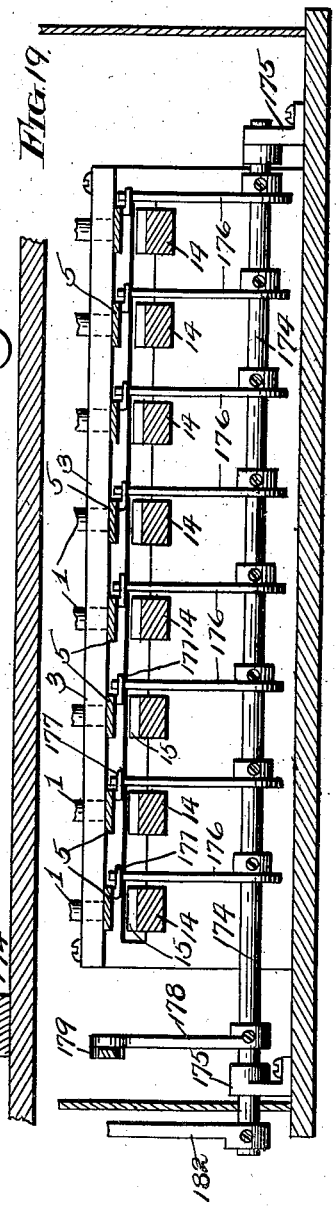

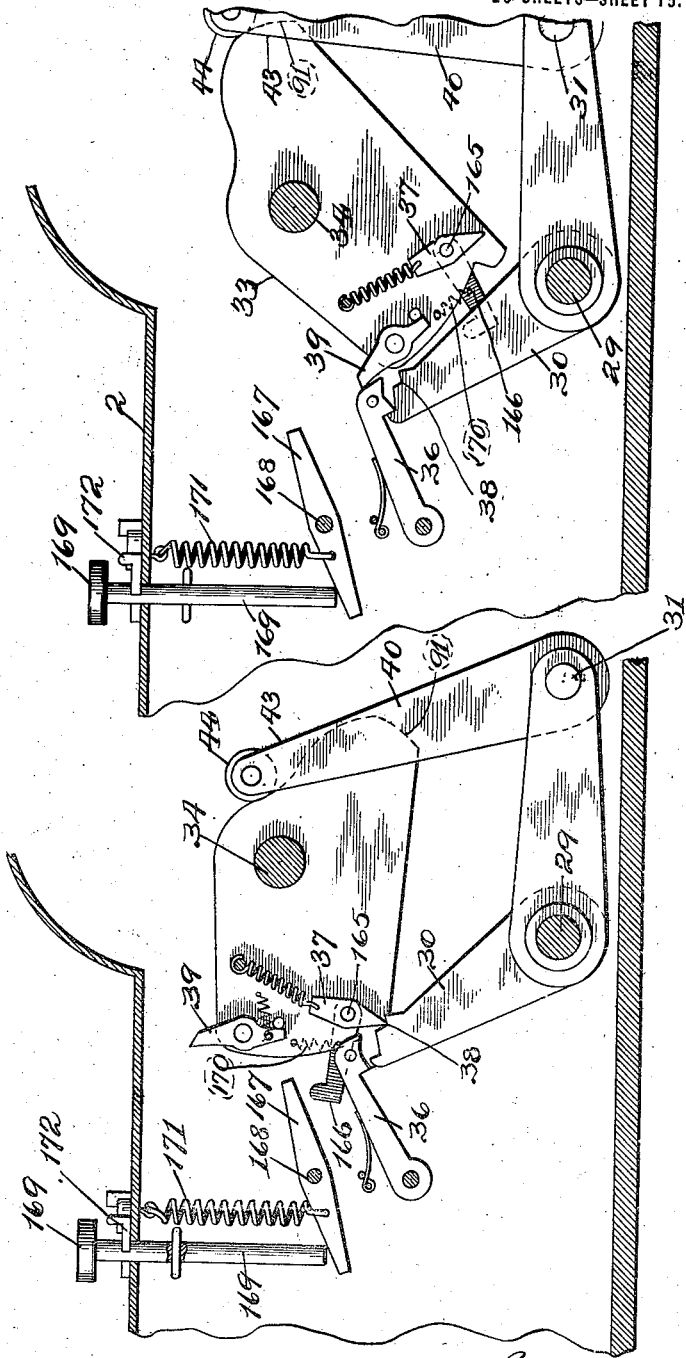

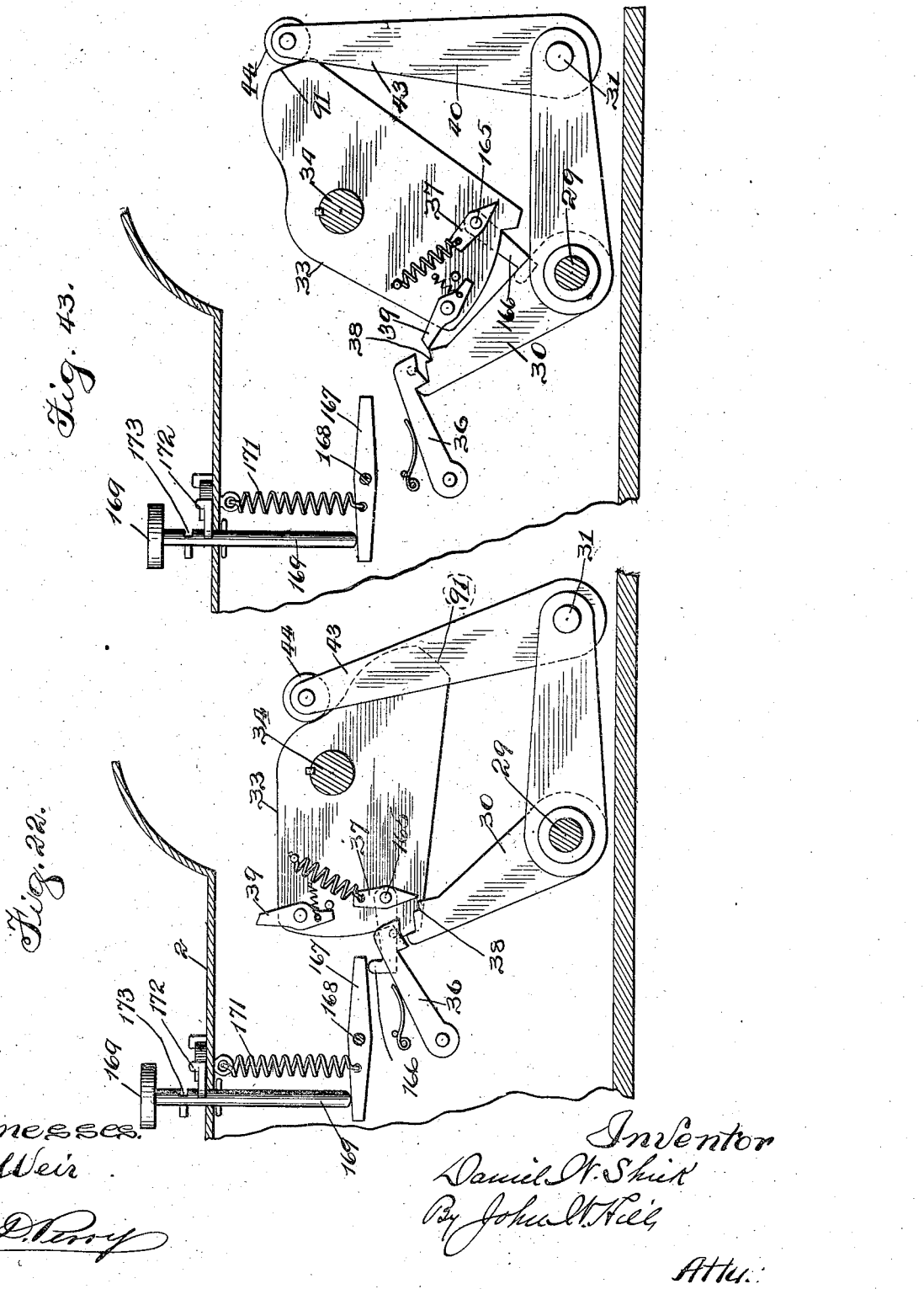

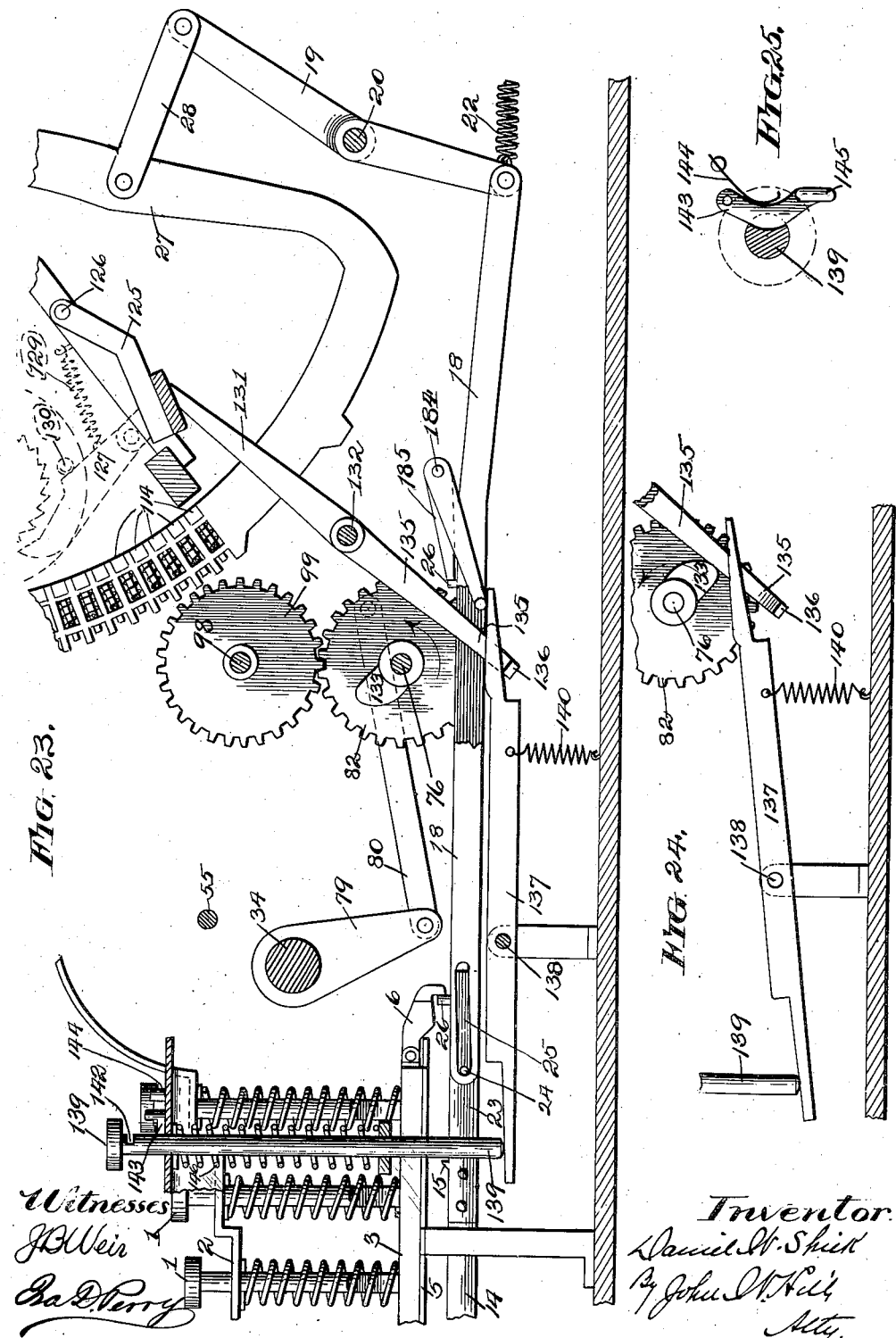

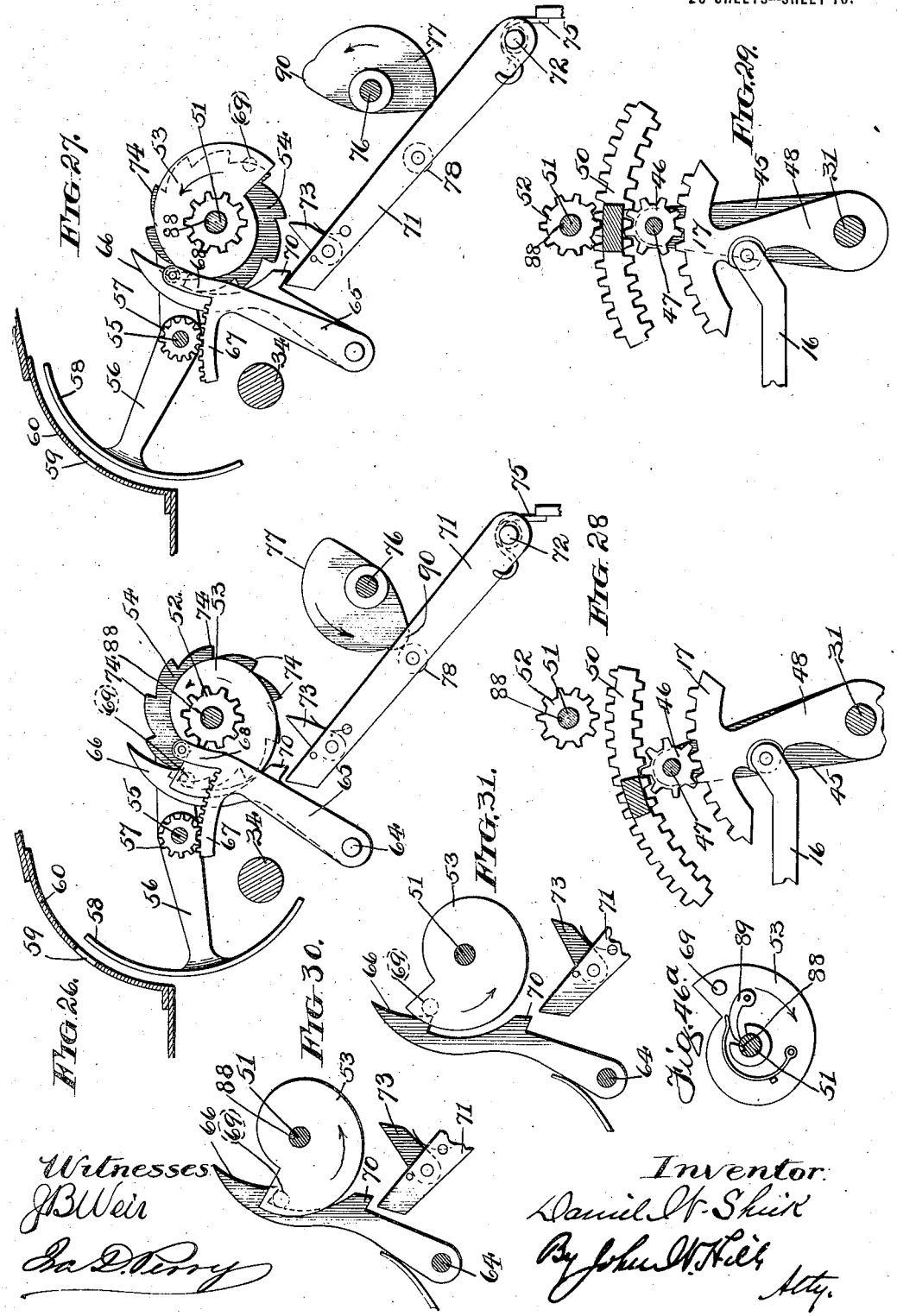

D. W. SHIEK.
CALCULATING MACHINE.
APPLICATION FILED DEC. 10, 1901.
1,143,920.
Patented June 22, 1915.
26 SHEETS—SHEET 19.
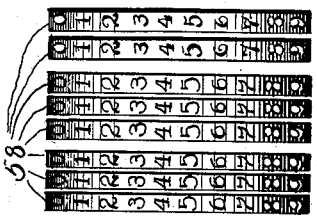
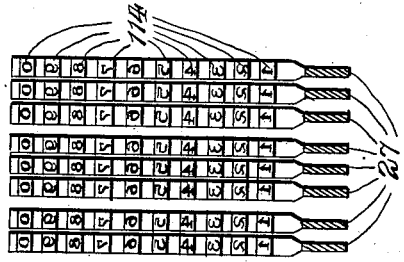
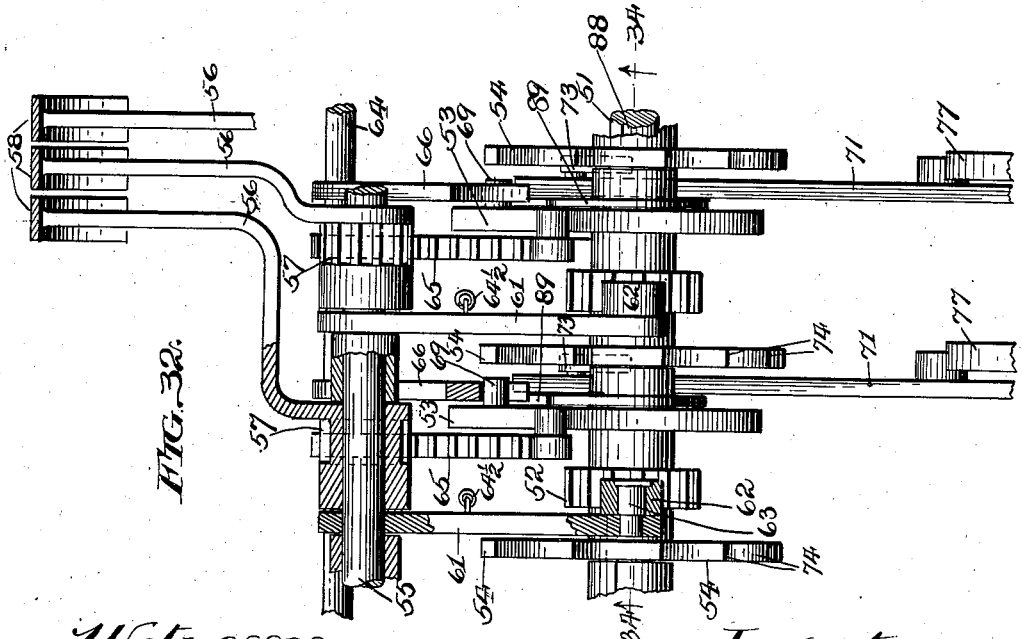

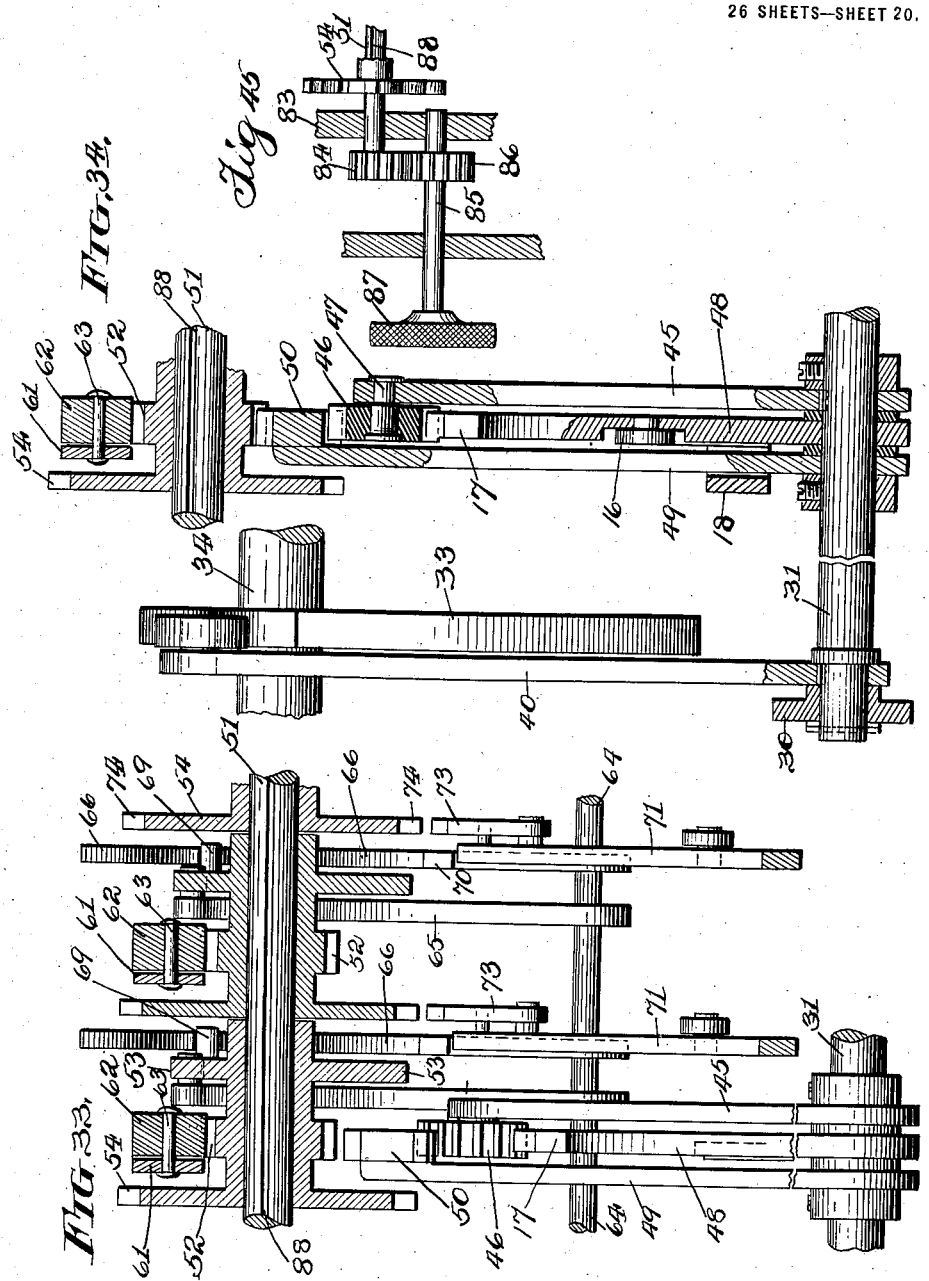

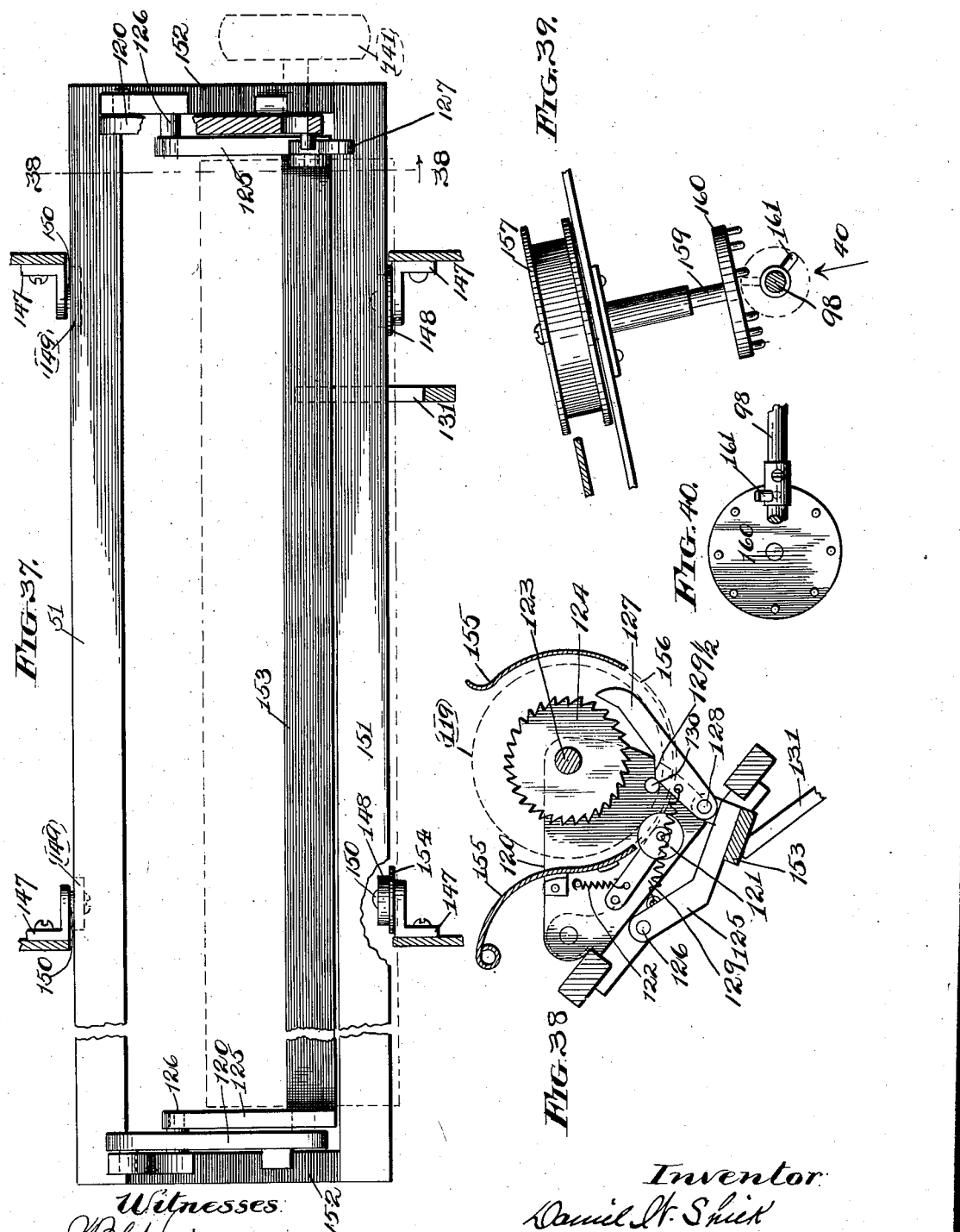

D. W. SHIEK.
CALCULATING MACHINE.
APPLICATION FILED DEC. 10, 1901.
1,143,920.
Patented June 22, 1915.
26 SHEETS—SHEET 22.
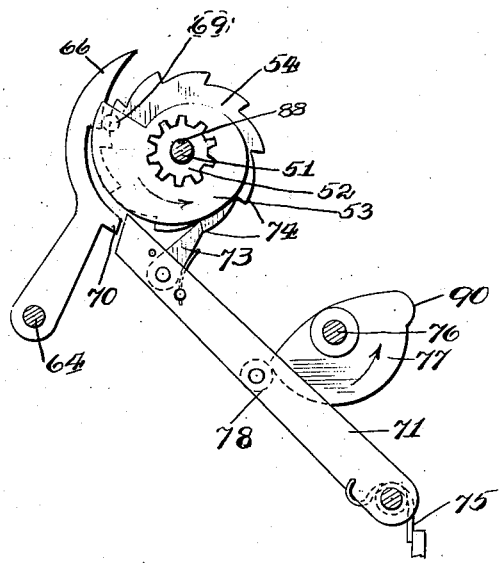
Fig. 44.
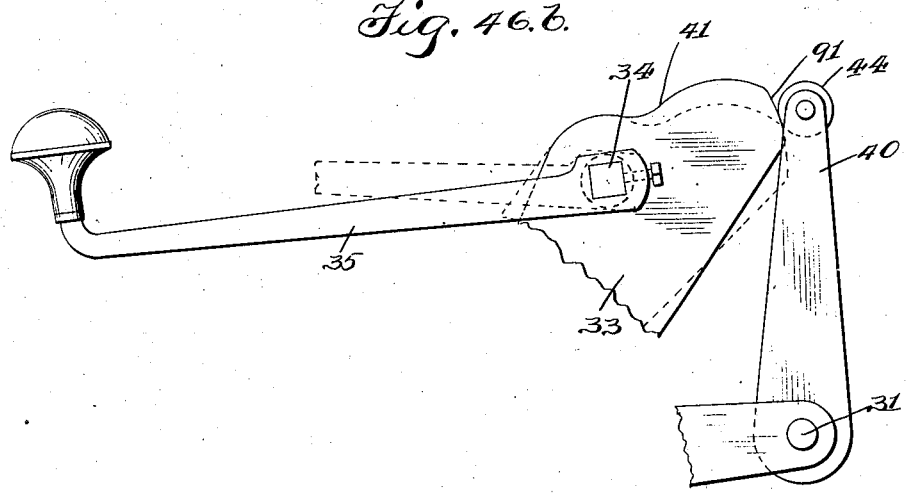
Fig. 46.b.

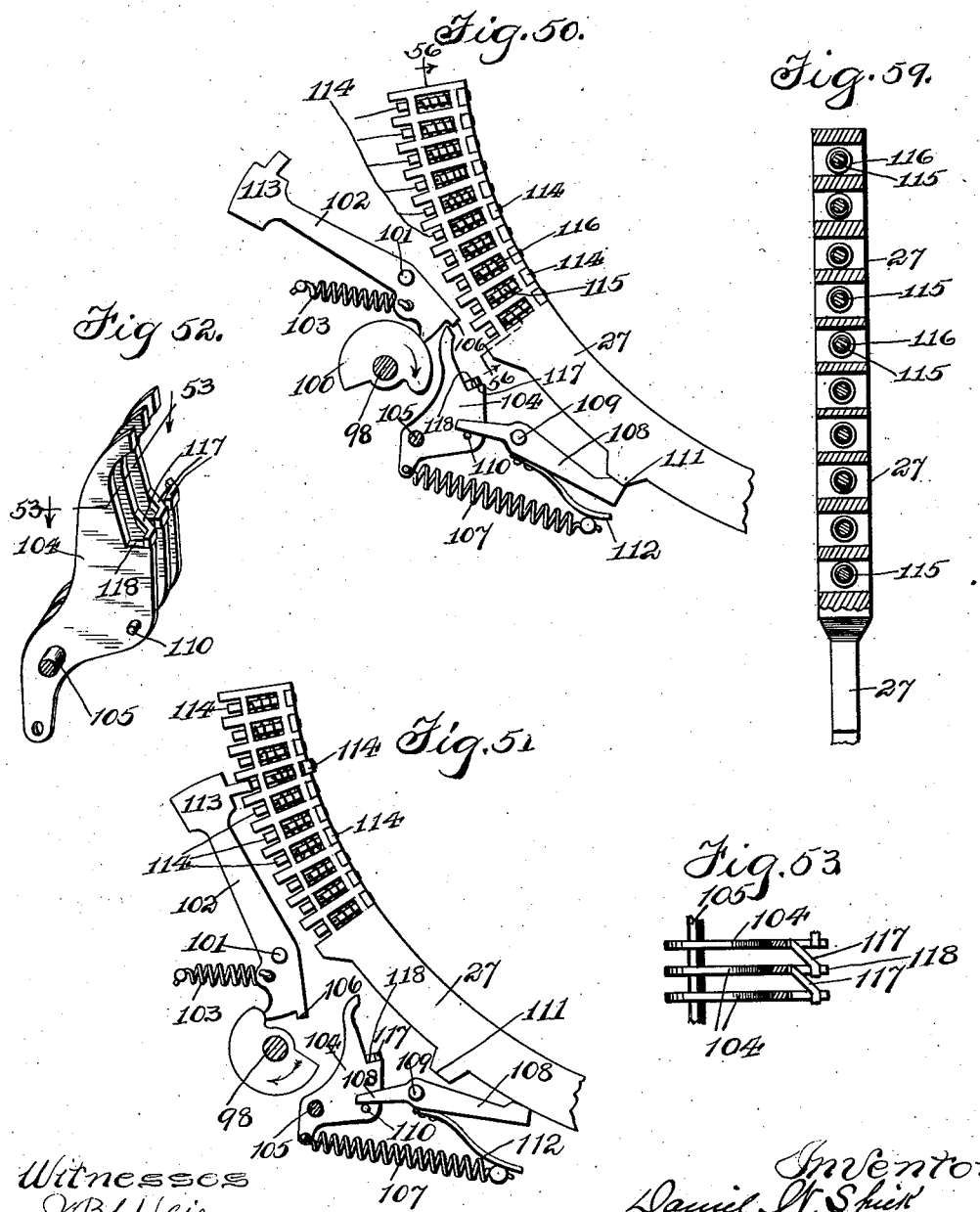

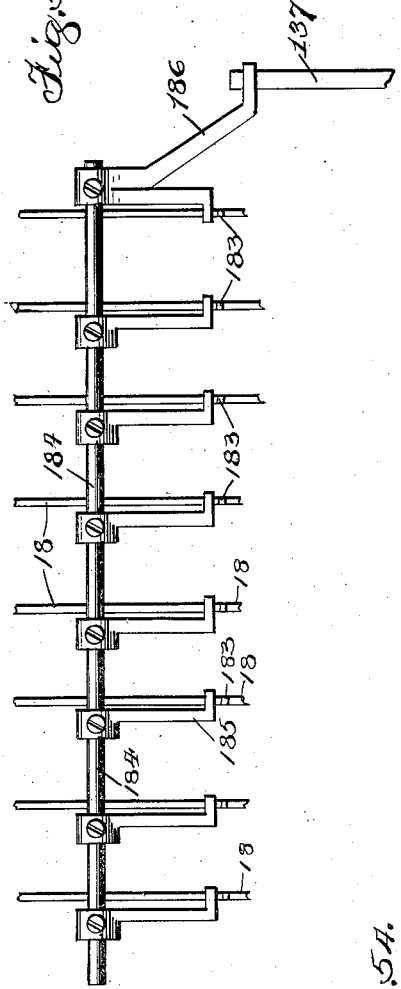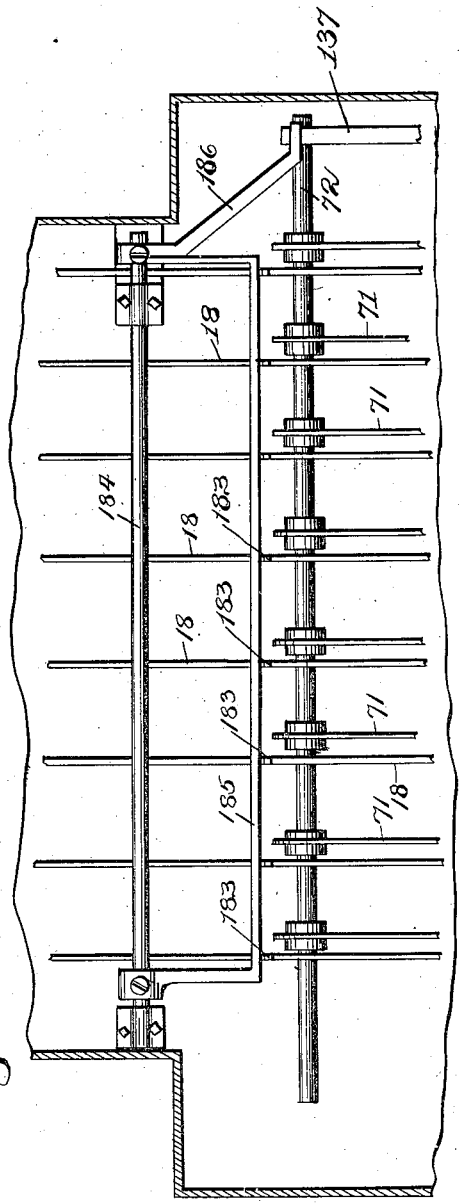

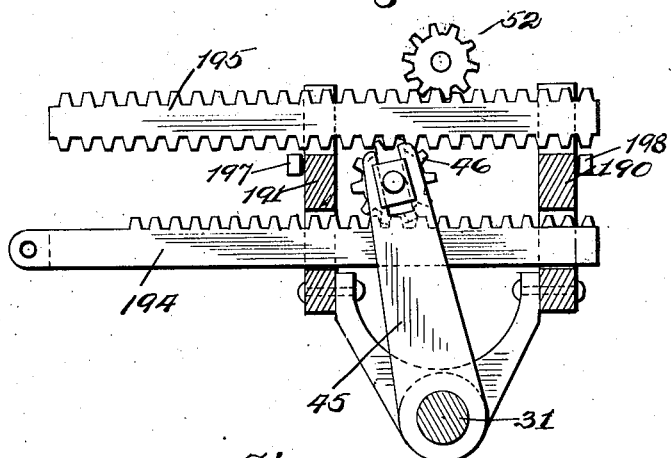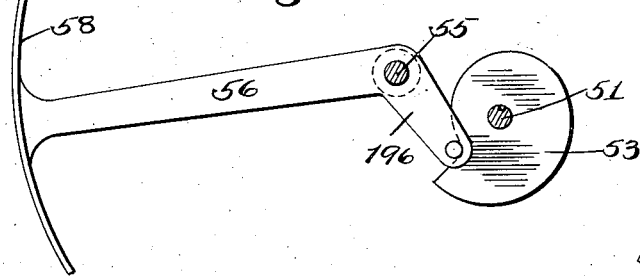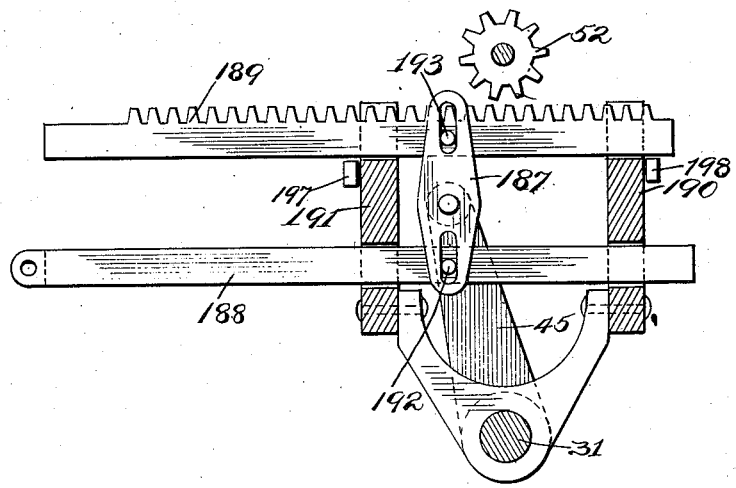

UNITED STATES PATENT OFFICE.

DANIEL W. SHIEK, OF CHICAGO, ILLINOIS, ASSIGNOR, BY MESNE ASSIGNMENTS, TO WALTER L. MILLIKEN, TRUSTEE.

CALCULATING-MACHINE.

1,143,920.  Specification of Letters Patent.  Patented June 22, 1915.

Application filed December 10, 1901. Serial No. 85,383.

*To all whom it may concern:*

Be it known that I, DANIEL W. SHIEK, a citizen of the United States of America, residing at Chicago, in the county of Cook and State of Illinois, have invented certain new and useful Improvements in Calculating-Machines, of which the following is a description.

The object of my invention is to produce an accurate and effective calculating machine, positive in its operation and simple and durable in its construction.

To this end my invention consists in the novel construction, arrangement and combination of parts shown and described and more particularly pointed out in the claims.

Figure 8:
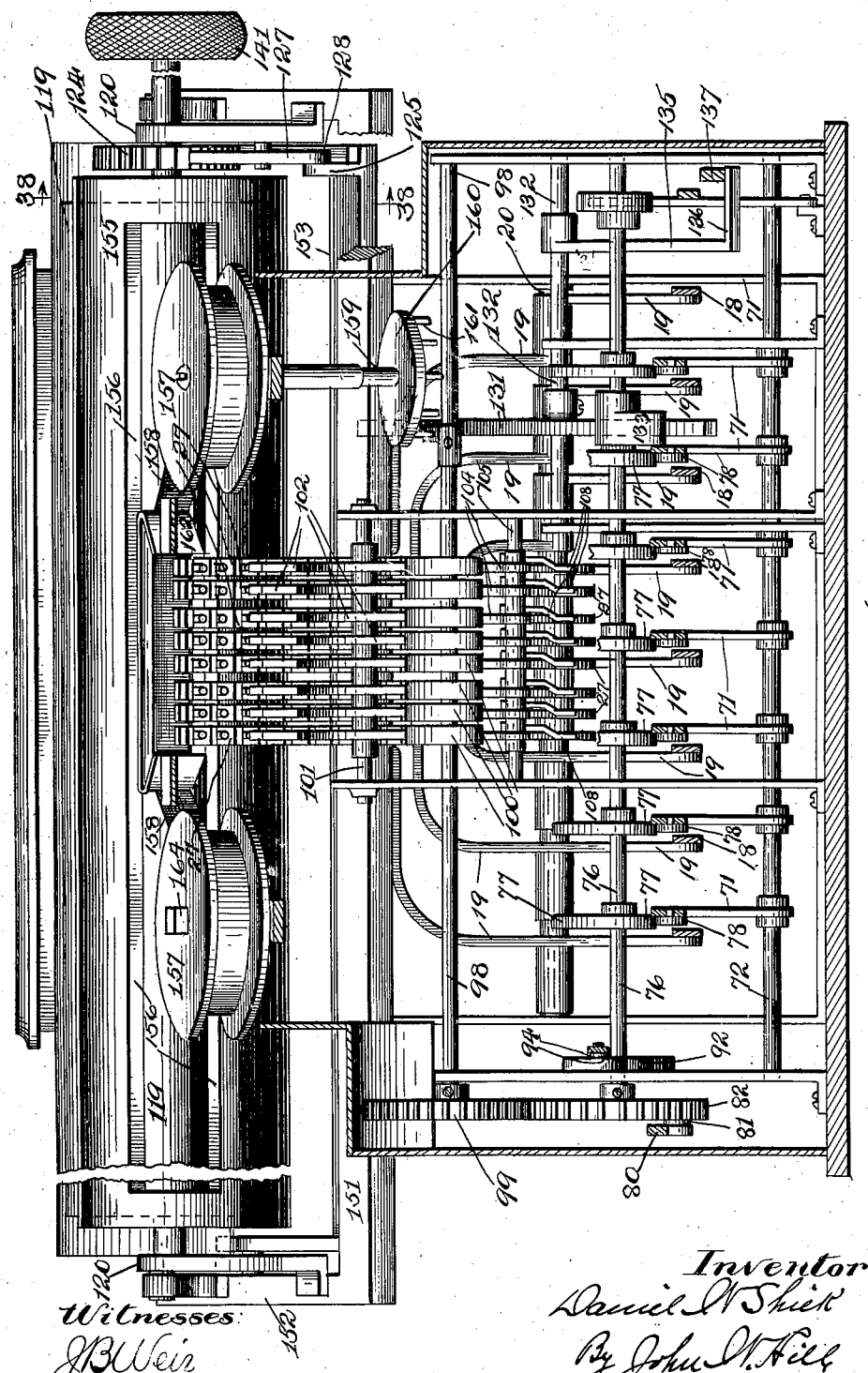
Figure 47:
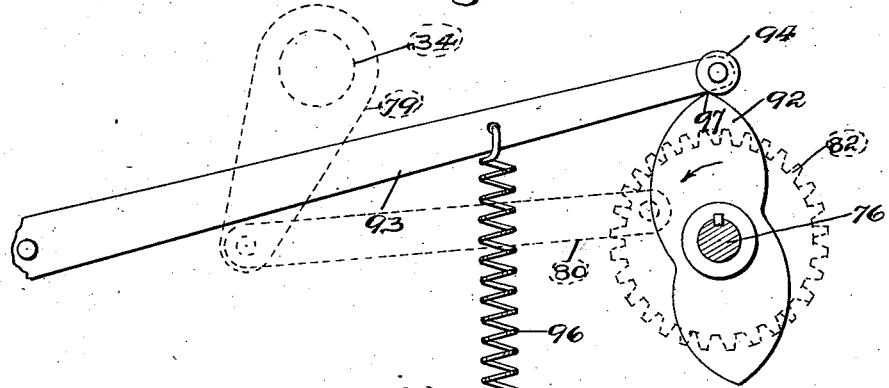
Figure 48:
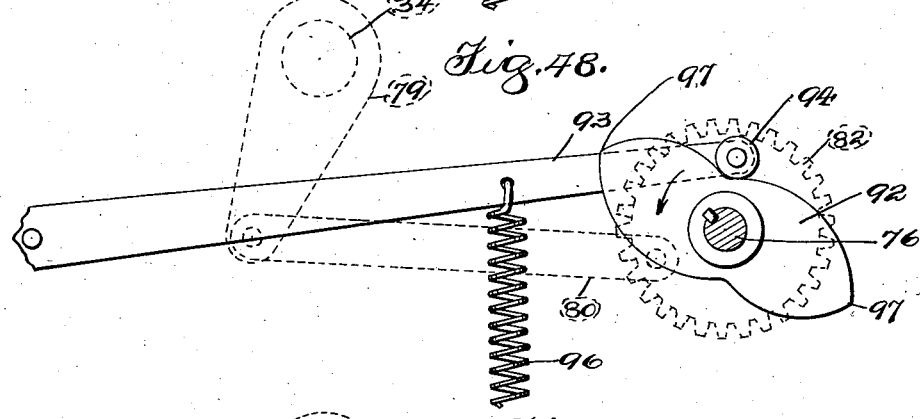
Figure 49:
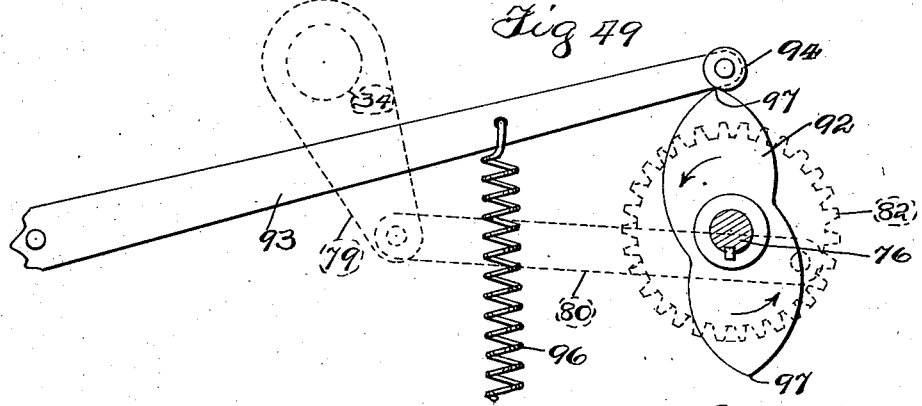

In the drawings, wherein like reference letters indicate like or corresponding parts, Figure 1, is a partial top plan of my improved device; Fig. 2, is a side elevation of the same; Fig. 3, is a partial side view with operating levers, knobs, and side plates removed; Fig. 4$^a$, is a substantially similar view showing the parts in an operative position, the parts being broken away to show the construction of the keys and their connections; Fig. 4$^b$, is a sectional view showing a longitudinal section or row of keys and their connections; Fig. 5, is a transverse section on line 5—5 of Fig. 4$^b$ with parts broken away; Fig. 6, is a detail view of the lower end of a key and its connection with the locking or retaining bar; Fig. 7, is a rear elevation taken on line 7—7 of Fig. 3, with parts removed to more clearly show the printing mechanism; Fig. 8 is substantially a sectional view on line 8—8 of Fig. 3, certain parts being shown in full lines to more fully and clearly show their construction and operation; Fig. 9, is a similar view on line 9—9 of Fig. 3, the printing hammers being removed to more clearly show the construction of the operating mechanism for computing and indicating; Fig. 10, a transverse sectional view on line 10—10 of Fig. 3, clearly showing a part of the indicating and computing mechanism, and also a part of the key releasing mechanism; Fig. 11, is a partial view from above, the cover plate being removed to show the type bars, hammers and connecting mechanism; Fig. 12, is a partial view from above, the cover plate being removed to show the computing and indicating mechanism; Fig. 13 is a partial top plan of the key-board, parts being broken away to show the construction; Fig. 14 is a partial top plan of the regulating bars and a part of the computing and indicating mechanism; Fig. 15, is a detail view of one of the regulating bars and its connections; Fig. 16, is a slight modification of the same; Fig. 17 is a top plan of the indicator arms and supporting shaft together with the spacing levers; Figs. 18 and 19, are detail views showing the preferred means for releasing all depressed keys at each complete operation of the device; Figs. 20, 21 and 22 are detail views of the operating cam and its connections; Figs. 23, 24 and 25, are detail views of a type carrying bar and its connections, together with means for operating the paper carrier; Figs. 26 to 31, inclusive, are detail views of the computing and indicating mechanism; Fig. 32, is a partial top plan of the indicating and computing mechanism, the same being enlarged and partly in section; Figs. 33 and 34, are partial rear elevations of the same, enlarged and partly in section; Fig. 35, shows the relative position of the several indicators and the order of their numerical values, when numerals are the characters employed; Fig. 36, shows the relative positions of the several type carrying bars and the type; Fig. 37, is a plan view of the platen carriage, with parts broken away; Fig. 38, is a section on line 38—38, Fig. 37; Figs. 39 and 40, are detail views of the ribbon spool and its mechanism; Fig. 41 is an enlarged front view of a type carrying bar and the type, when numerals are employed; Fig. 42, is a sectional view showing one of the type and the preferred method of mounting the same; Fig. 43, is a view of the operating cam, similar to Figs. 20, 21 and 22, with the parts in a different position during operation; Fig. 44 is a detail view of the "carrying" mechanism employed in computing (see Figs. 26 to 29). Fig. 45 is a sectional view showing simple means for operating the canceling or resetting mechanism; Fig. 46$^a$, is a detail view of a part of the mechanism operating the indicators; Fig. 46$^b$, is a detail view of the main operating lever and the cam carried thereby; Figs. 47, 48 and 49, are detail views of means for carrying the rotation of the parts by the dead center; Figs. 50, 51, 52 and 53 are details of the printing mechanism; Figs. 54 and 55 are detail views of the means for locking the printing mechanism, preventing its operation; Figs. 56 and 57 are modifications of the operating means for the computing and indication mechanism, and Fig. 58, is a modified form of indicator; and Fig. 59 is a partial sectional view of the type carrying bar and type.

In the drawings, 1, 1, etc. are vertically movable keys arranged in banks as shown preferably corresponding to the numerals 1 to 9 inclusive, each numeral row consisting of a sufficient number of keys to register the highest numerical quantity likely to be required. As shown in the drawings the key board comprises nine banks representing the ordinals 1 to 9 inclusive, each bank consisting of a row of eight keys, (see Fig. 1). For brevity and convenience of description, I shall hereafter refer to a row of keys extending longitudinally of the machine, containing the numerals 1 to 9, respectively, as a "section" of keys, while a transverse row of keys each with the same numeral thereon, as a "row" of keys.

2, is the cover plate of the key board, and 3 is the base plate. The keys are positioned in suitable apertures formed in the plates 2 and 3, and are normally held in a retracted position by suitable springs 4, or equivalent means. (See Fig. 4ᵇ.)

5 is a longitudinally movable bar arranged to control the operation of the dog 6, and to retain the key in a depressed position. (See Figs. 4ᵇ and 6). The lower end of each key in a section is constructed to loosely engage a bar 5 to longitudinally move the same and retain it in operative position. In the preferred form the lower end of the key is provided with an inclined face 7 and a shouldered notch 8. The point or reduced end of the key is positioned in an aperture 9, or its equivalent, formed in the bar 5, so that upon depressing the key the inclined face 7, contacting with the wall of the aperture 9 forcibly moves the bar longitudinally for the purpose hereafter described. When the notch 8 comes in line with the bar a resilient member tending to force the bar into a normal position forces the wall of the aperture into connection with the notch 8, in which position the bar is retained until released by removing the key. (See Fig. 6).

In the preferred form the free end of the bar 5 is formed to contact with a shouldered or equivalently formed pin 10, movable in a seat formed in the base plate 3, or an equivalent part, provided with a spring 11 tending to normally hold the bar 5, at the outward limit of its movement, (see Fig. 4ᵇ). The dog 6, is pivotally supported upon a fixed part, as the plate 3, and is formed to be operated by the longitudinal movement of the bar 5. As shown the dog is provided with a cam face or shoulder 12, against the end of which the bar 5 is adapted to contact, lifting the dog to release the part engaging therewith as a key is depressed. (See Fig. 4ᵇ).

It is desirable that no more than one key in a section should be engaged with the bar 5 at the same time. To insure such result I prefer to so construct the device that when one key is set, the setting of another in the same section will release the first. A simple means for accomplishing this object consists in constructing the outer part of the notched shoulder with an oppositely extending incline 13, the two faces 7 and 13 being extended at an angle to one another clearly shown in Fig. 6. When a key is set manually depressing another key in the same section moves the bar 5 sufficiently for the wall of the aperture to contact with the inclined face 13 of the key to a point near the apex of the angle, when the force of the spring 4 is sufficient to cause the entire release of the key.

A longitudinally movable bar 14 is positioned beneath and in line with each section of keys. Said bar is provided with stops 15 corresponding in number with the number of keys in each section. (See Figs. 4ᵇ, 5, 14, 15 and 16). A bar 16, is so connected to the bar 14 as to permit a slight vertical play to its free end which is connected to a pivotally supported cog-rack 17, transmitting movement thereto for a purpose hereafter described, (Figs. 28, 29, 33 and 34). As shown the connection of the bar 16 with the bar 14 and the cog-rack 17, is pivotal, permitting the free movement of the latter in a manner permitting a limited pivotal movement of one bar on the other. As shown the bar 18 is connected to the bar 14 by a slot and pin connection and extends therefrom to the end of the lever 19 pivotally supported preferably between its ends on a shaft 20. (Figs. 3, 4ᵃ, 4ᵇ, 7, 14, 15 and 16). Spacing sleeves 21, preferably formed integral with the levers 19 afford a bearing for the support of the levers on the shaft 20, and retain them in proper relative position and in proper alinement with the connecting mechanism. (Figs. 7 and 11).

In the preferred form a spring 22, or equivalent means serves to impart movement to the bar 18 and levers 19, controlled by the (slot and pin) connection of the bar 18 with the bar 14. The (slot and pin) connection referred to may be formed as shown in Fig. 15, in which an extension 23 carries a pin 24 which is located in the slot 25 in the bar, or the connection may be directly with the bar 14 as shown in Fig. 16, the latter method being preferred. The spring 22 causes the lever 19 to move a distance regulated by the limit of movement permitted by the connection of the bar 18 with the bar 14. A stop 26 on the bar 18 engages with the dog 6 preventing the movement of the said bar until said dog is released by the movement of the bar 5 before referred to. Until so released the bar 14 is permitted a longitudinal movement on the bar 18 limited by the length of the slot 25 in said bar 18. It is obvious the position of the slot and pin connection may be reversed or an equivalent connection substituted without modifying the operation of the parts.

27 is a substantially V-shaped type carrying bar pivotally supported at one end to permit its free end to move in the arc of a circle as will be more fully described hereafter. A strap or bar 28 transmits the motion of the levers 19 to the said type carrying bars, (Figs. 3, 4ᵃ, 7, 11, 23).

A transverse shaft 29, has firmly secured thereto near one end a bell crank lever 30, (see Figs. 3, 4ᵃ, 9, 14, 20 and 21). One arm of the lever 30 is extended and forms a bearing for the end of a shaft 31. An arm 32 firmly keyed or secured on the opposite end of the shaft 29 (Figs. 9 and 14) forms the bearing for the opposite end of the shaft 31. The said shaft is, therefore, permitted a limited movement with the shaft 29 as a center. The other arm of the bell crank 30 is extended to coöperate with a cam 33, fixed to a shaft 34, manually operated by a hand lever 35. A latch 36 serves to engage the free arm of the bell crank 30 when the latter is depressed to hold the same in position. A dog 37, carried by the cam 33, engages a notch 38 in the arm of the bell crank 30 so that upon forcing the hand lever 35 downward and rotating the shaft 34 and the cam 33, the dog 37 engages the notch 38 in the bell crank 30 forcing the same downward rotating the shaft upon which it is mounted and lifting the other end of the crank 30 and the shaft 31 and its connected parts, for a purpose hereafter described. The latch 36 engages the end of the bell crank retaining the same in position as the dog 37 passes its center and is disengaged from the crank arm. A trip 39 also carried by the cam 33 engages the end of the latch 36 as the parts reach their limit of movement and as the parts start to return to their normal positions the latch 36 is raised releasing the arm of the crank and permitting the shaft 31 to return to its normal position.

Any preferred means may be employed to return the shaft 34 and its connections to their normal positions. As shown a spring 42 has this function aided by the tendency in this direction in the mechanism of other parts of the device. (Figs. 9, 10 and 12).

The shaft 31 has an arm 40 fixed thereto constructed at its free end to engage with the face 41 of the cam 33, (Figs. 21, 20 and 22). In the preferred construction, the end of the arm 40 is provided with an anti-friction member. As shown in the drawings the roller 44 performs this function.

A series of arms or levers 45 corresponding in number with the number of keys in each row, (eight, as shown in the drawings) are fixed to the shaft 31, the free ends of which describe an arc of a circle as shaft 31 is rotated by the contact of the roller 44 on the cam face 41 of the cam 33. The free ends of the arms 45, are provided with cog wheels or pinions 46 loosely mounted on the pin 47, (Figs. 4ᵇ, 9, 28, 29, 33, and 34). The arm or lever 48 carrying on its free end a cog-rack 17 before referred to, and the arm 49 carrying on its free end the double cog-rack 50, are both loosely mounted on the shaft 31, with the cog-racks 17 and the inner cog-rack of the cog-rack 50 being constantly in mesh with the pinion 46. A shaft 51 located near the cog-rack 50 has loosely mounted thereon a series of pinions 52 arranged in line with said cog-racks 50 and adapted to mesh therewith when the shaft 31 and the parts carried by it are shifted by the bell crank 30 as before described. (See particularly Figs. 28 and 29, also Figs. 3, 4ᵃ, 33 and 34).

As thus far described it will be seen that the operation is as follows: Upon setting a key in a section the bar 5 is moved longitudinally releasing the stop 26 from engagement with the dog 6, and retaining the key in a depressed position with its end in line to contact with the proper stop 15 as the bar 14 is longitudinally moved. In the initial movement of depressing the hand lever 35, the dog 37 on the cam 33, engages the notch 38 near the end of the bell crank lever 30, depressing the lever to engage the latch 36 which retains the lever in said position. (Figs. 20 and 43). This action lifts the shaft 31 bringing the cog-segment 50 into meshing engagement with the pinion 52 on the shaft 51. Upon further depressing the lever 35 the cam face 41 of the cam 33 forces the free end of the lever 40 rearward rotating the shaft 31 and swinging the free end of the arm 45 secured thereto and its pinion 46 forward. The cog-rack 50 being temporarily retained in position in engagement with the pinion 52, is prevented from moving by the pinion and its associated parts including roller 62; presently to be described, and upon the rearward movement of the pinion 46 meshing therewith drives the cog-rack 17 rearward a distance limited by the engagement of the stop 15 on the bar 14 with its key 1. At this instant the segment 17 stops and is firmly held in such position causing the continued rearward movement of the pinion to drive the cog-rack 50 rearward a distance regulated by the limit of movement remaining to the hand lever 35 and a corresponding rotation to the pinion 52 and its connecting mechanism. It will be noted that the pinion 52 is positively governed by the rearward movement of the cog-rack 50, and that the latter is positively governed by the movement of the cog-rack 17. The segment 17 in its turn is controlled by the longitudinal movement of the bar 14 which depends upon the distance between the stop 15 and its key. It will also be noted that said distance is gradually and regularly varied, to vary the distance the connected parts may move and consequently the rotation of the pinion 52.

In reversing the movement of the hand lever 35 the initial movement causes the trip 39 on the cam 33 to disengage the dog 36, releasing the bell crank 30 therefrom and permitting the shaft 31 and the parts carried thereby to return to their normal position, (Figs. 3 and 4ᵃ). This action releases the cog-rack 50 from engagement with the pinion 52 and the various parts are returned to their normal positions. The spring 42½ (Fig. 9) attached at one end to one of the arms 45, and at the other to a fixed part of the machine, as to a side plate or equivalent means, together with the construction and arrangement of the various parts and their springs accomplishes the reverse movement.

The several connecting parts are so constructed that if no key is depressed, the operation of the hand lever will cause the oscillation of the cog-rack 17 only without disturbing the cog-rack 50 and pinion 52. The dog 6, at the same time engaging the stop 26 holds the bar 18 immovably in position, the slot 25 being of sufficient length to permit the forward movement of the bar 14 as the cog-rack 17 is oscillated. Thus the typebars 27 remain undisturbed.

The pinion 52 is provided with and carries a cam 53 and a ratchet wheel 54. In the preferred construction the said pinion, cam and ratchet are formed integral with one another as shown in Figs. 32 and 33. (See also Figs. 26, 27, 30, 31 and 44 in which the cam 53 of one order is shown and the ratchet cam 54 of another is shown back of it.)

A shaft 55 is arranged near the shaft 51 and is provided with a series of arms 56 connected to or formed integral with pinions 57 loosely mounted on said shaft, (Figs. 26, 27 and 32). The number of said arms corresponds with the number of sections of keys 1. Each arm 56 is provided on its end with an indicator section 58. (Figs. 17, 26 and 27). Each section 58 has formed upon its face any preferred system of characters. As shown these consist of the ordinals from 0 to 9 inclusive, and as each arm 56 is oscillated on its shaft 55 as a center, the ordinals are successively presented to view through an opening 59 formed in the cover plate 60, (Figs. 26 and 27). A bar 61 is also loosely mounted on said shaft 55, extends to the shaft 51 and is provided with a roller 62 loosely mounted on a pin 63 near the end thereof. As shown in the drawings (Figs. 17, 32, 33, 34 and 12) the roller 62 contacts with the periphery of the pinion 52 and finds a seat in the depression between two adjacent teeth or cogs of the pinion. The pinion 52 in the preferred construction is provided with ten (10) teeth and consequently ten (10) depressions. The engagement of the rollers 62 with the pinions 52, therefore, spaces the rotation of the pinions and at the same time keeps all the pinions in proper alinement to correctly exhibit the ordinals on the indicator sections 58 at the opening 59. If preferred the roller may be arranged to engage with the periphery of the ratchet wheel 54 for the same purpose, said wheel being provided with ten (10) teeth and corresponding depressions for a purpose hereafter made plain. In the preferred construction springs 64½ or other suitable means are employed to insure a resilient engagement of the roller 62 with the spacing pinion or ratchet wheel, (Figs. 17 and 32).

A shaft 64, located near the shaft 55, (Figs 9, 10, 26, 27, 30, 31, 32, 33 and 34) has loosely mounted thereon a series of cog-levers 65 and a series of trip levers 66, (Figs. 26, 27, 32 and 35). In the preferred form each cog-lever is provided with a cog-rack 67 engaging the pinion 57 of one of the indicator bars 56 (Figs. 26 and 27) and an extension 68, formed at its end to ride upon the periphery of a cam 53. As the snail cam is rotated, therefore, the lever is oscillated back and forth alternately lifting the indicator 58, displaying the characters and letting it return to its normal position shown in Fig. 26. Gravity is generally sufficient to return the indicators to their normal positions. If desired suitable means may be employed to aid in this result.

A pin 69 extending from the side of the cam 53 or equivalent means, is arranged to engage the trip lever 66 at each revolution of the cam to oscillate the lever. (Figs. 26, 27, 30, 31, 44, also 32, 33 and 9.) The lever 66 is provided with a shoulder 70 constructed to normally engage the end of the lever 71 which is pivotally supported on a shaft 72. A dog or detent 73 on said lever 71 is arranged to engage the teeth 74 on the ratchet 54 successively as the trip 66 releases the lever 71 and to rotate said ratchet and the shaft to which it is secured a predetermined distance. A spring 75 or equivalent means is provided to force the arm 71 upward when released from the shoulder 70 for the purpose stated, (Figs. 26, 27, 44).

As before stated the pinion 52, cam 53 and ratchet 54 are secured together or formed integral with one another in the operation just described, however, the cam 53 of one section controls the lever 71 operating the ratchet 54 of the next adjacent section of a higher order and hence the next adjacent indicator arm. By this operation each full revolution of a snail cam 53 displays all the ordinals on the indicator controlled by it from 0 to 9 inclusive and so by progressively measured steps or distances, and returns the indicator to 0, and upon releasing the indicator the cam also releases the trip 66 and thus advances the ratchet 54 controlling the next adjacent indicator of a higher order on the left (when facing the device) one interval, thus carrying one (a ten for example to the proper indicator of the next higher order, (see Fig. 44).

A shaft 76, has mounted thereon a series of cams 77 rotating with the shaft, and corresponding in number with the arms or levers 71 with which they coact. In the preferred form an anti-friction roller 78, is secured to the lever 71 and rides upon the periphery of the cam (Figs. 26, 27 and 44). The cams 77 are so formed and arranged, and the rotation of the shaft 76 is so timed that as one indicator is released by the complete revolution of a cam 53 the cam 77 will also release the lever 71 controlled by that particular cam 53 carrying the tens to the next indicator of a higher order, if the lever is free to operate as described.

In the preferred form shown in Figs. 9, 10 and 12, the end of the shaft 34 opposite to the hand lever 35, is provided with an arm 79 which is secured thereto and is oscillated thereby as the hand lever 35 is operated. A pitman bar 80 extends from the bar 79 to a wrist pin 81 on the pinion 82 secured to the shaft 76 (Figs. 8, 9, 10, 11 and 12). At each complete oscillation of the hand lever 35 therefore, the shaft 76 and the cams 77 are given a complete revolution.

One end of the shaft 51 is supported by a bearing 83 (Fig. 45) which it passes through and is provided at its end with a pinion 84. A short auxiliary shaft 85, carries a pinion 86 meshing with the pinion 84. The other end of the auxiliary shaft 85 is formed to be readily turned by hand. As shown a suitable knob 87, serves this purpose. Thus by turning the knob 87 to the right as indicated in Fig. 2, the shaft 51 will be turned in the reverse direction, or as shown, to the left. The said shaft 51 has formed therein a notch or shoulder 88, or equivalent means. Pawls or dogs 89 secured to the cams 53 or to some other part of the members secured thereto or integral therewith have their ends extended through a suitable opening in the collar carrying the parts to engage said shoulder as the said shaft 51 is rotated to the left or in opposition to the pawls, (Figs. 46, 12, 32, 33, 34, also 26 and 27). It will thus be seen that by turning the knob 87 and rotating the shaft 51 as described the pawls 89 will severally engage the shoulder 88 first putting all the cams 53 and the parts governed thereby into alinement when a still further movement will rotate the said cams in unison to the point when the engaging part of the arms 68 fall into the lower part of the cams 53 permitting the indicator arms 58 to fall to their normal position, (Fig. 26). By this operation the amount previously indicated is canceled so far as the indicators are concerned, and the device is reset ready to begin the next computation. This portion of the mechanism will therefore be referred to hereafter as the canceling mechanism.

In the preferred construction the several cams 77 are provided with an extra high part 90 (Figs. 26, 27 and 44) which when the parts are in their normal position engages the rollers 78 on the arms 71 and holds the same in such position that the dog or pawl 73 will not contact with the ratchet wheel 54 as the latter is rotated (see Fig. 26). The canceling mechanism may therefore be readily operated when all the parts including the hand lever 35, the shaft 31 and the parts carried by them are at rest in their normal position. It will be readily understood, however, that when upon the initial movement of the hand lever 35 the shaft 31 is laterally moved bringing the cog rack 50 into mesh with the pinion 52 (Figs. 29 and 34) the parts are locked by said engagement and the canceling mechanism cannot be readily operated independently. In other words, the law of the structure is that the canceling mechanism may not be independently operated when the parts controlling the operation of the indicators are not in their normal positions, or during the operation of the device, but the canceling mechanism may be independently operated when they are in their normal positions. The importance of this provision is apparent. It will also be clear, however, that while the cog-rack 50 is in mesh with the pinion 52, the carrying mechanism cannot operate effectively, the parts being locked as before stated. To provide for this contingency and also for a purpose hereafter explained, the cam 33 is formed with a section 91 (Fig. 46$^b$) so that the roller 44 on the arm 40 after reaching the end of the cam face 41, will contact with the section 91 and the said arm will not be oscillated further by the cam, but will maintain the relative position it then occupies. At the same time the hand lever 35 is allowed a further movement, further rotating its shaft 34 and carrying forward the arm 79 (Figs. 9, 10 and 12) the connecting bar or rod 80, and the rotation of the shaft 76 with its cams 77. When the hand lever 35 has reached the limit of its downward movement the initial movement of the return of the parts to their normal positions causes the dog or trip 39 to engage the latch 36 lifting the same to disengage the bell crank 30, thus permitting the shaft 31 and the parts carried thereby to drop. This releases the cog-rack 50 from engagement with the pinion 52. The cams 77 in the preferred form, are at or near the point of releasing the lever 71 (Fig. 44) which is then free to move upward unless retained by the lock or projection 70 engaging the end of the arm. If a section has added a sufficient number to require the carrying of a numeral or ten to the next higher column, the pin 69 on the cam 53 will engage the arm 66 releasing the arm 71 from the lock 70, as before described, and as the arm 71 is released from the influence of the cam 77 (Fig. 44) the end of said arm is oscillated, the pawl 73 engages one of the teeth 74, and as described rotates the adjacent ratchet 54 and its attached cam 53 one tenth of a revolution, and through the intermediate mechanism before described (Figs. 26 and 27) brings the next ordinal on the proper indicator into view through the sight opening 59. The "carrying" is therefore, accomplished at the moment the several cams and ratchets carried by the shaft 51 are free from the control of the several cog-racks 60 and during the time the cams 77 are completing their revolution the low part of the several cams being then next the arms 71. As the hand lever 35 returns to its normal position all the parts thus far described also resume their normal positions except that part of the indicating mechanism which is maintained until another number may be added by again operating the device, or the amount is canceled by operating the canceling mechanism as before described.

In the preferred construction suitable means are provided to positively carry the rotation of the shaft 76 by the dead center as it is driven by the reciprocation of the arm 79 and pitman rod or arm 80. I prefer to accomplish this in the simple manner shown in Figs. 47, 48 and 49. As shown the shaft 76 is provided with a preferably double cam 92, which coöperates with a bar 93 riding upon the periphery of the cam. An anti-friction roller 94 may be employed if desired, for contact engagement with the cam. The bar 93 is pivotally connected at its opposite end to the plate 95 supporting the parts or some adjacent part. A spring 96 or equivalent means may be employed to bring the roller 94 into forcible contact with the face of the cam 92 as it passes the point 97 of the latter. This action forcibly rotates the shaft to a point beyond the dead center in its revolution.

Referring now more particularly to the printing mechanism, a shaft 98 is driven by a pinion 99 on its end meshing with the pinion 82 on the shaft 76. (Figs. 8, 3, 4ª, and 23). The pinions 99 and 82 are of the same size so that each revolution of the latter insures a complete revolution of the former. Near the middle of the shaft in line with the several type bars 27 are secured a series of cams 100 corresponding in number with the type bars. Near said shaft 98 is a short shaft 101 having loosely mounted thereon a series of hammers 102 also corresponding in number with the number of type bars 27 and in line therewith. One end of each hammer is extended and formed to contact with a cam 100, if unrestricted, a spring 103 insuring such action and also serving to move the hammer rearward when permitted by the cam. A dog 104 pivotally supported on the shaft 105, is extended in line with an extension 106 on the end of the hammer, (Figs. 50, 51, 3 and 4ª). A light spring 107 or other equivalent means causes the dog to assume a normal position to engage the extension 106 of the hammer to arrest it and lock it in such position as to prevent its operation. The parts are shown in such position in Figs. 3 and 50. Controlling dogs 108 each pivotally supported as at 109 extend at one end above a pin 110 on the side of the dog 104, while the other end extends in line with a type bar 27 coöperating with a cam extension 111 formed on said bar. A spring 112 or its equivalent for the purpose, causes the end of the dog 108 to follow the edge of the bar and is of sufficient strength to overcome and dominate the spring 107.

Referring particularly to Figs. 3 and 50 it will be seen that until the type-bars 27 are moved out of their normal position, as heretofore explained, the hammers 102 are locked preventing their operation as the shaft 98 and cams 100 are rotated at each reciprocation of the hand lever 35. As soon, however, as the setting of a key 1 allows the movement of a type bar 27 the dog 108 is released from the control of the cam extension 111, the spring 112 overcomes the spring 107 swinging the dog 104 out from behind the extension 106, of the hammer, which by the rotation of the cam 100 and the action of its spring 103 is operated the head 113 swinging outward and striking a blow upon one of the longitudinally movable types 114, when in line therewith, (Figs. 4ª and 51). The general or carrying type bars 27 each carry a series of type showing any preferred characters, as the numerals from 0 to 9 inclusive (Figs. 36, 41). Each of said type is mounted on the end of a bar or rod 115 longitudinally movable transversely the carrying bar 27. A spring 116, or equivalent means, is provided to normally hold the type in a retracted position, (Figs. 42 and 54). As before stated, which one of the type will be positioned in line with the hammer 102 will depend upon the movement of the carrying bar 27 controlled by the particular key 1 of that section which may be depressed, and the intermediate mechanism.

It will be observed that the numeral 0, is in line with the swing of the hammer when the parts are in their normal position. If the hammers are not released from the control of the dogs 104 there can be no printing. If, on the other hand the carrying bars 27 are not operated, but retain their normal position (Figs. 3 and 50) and the hammers be released, the operation of the hand lever 35 will cause the printing of a series of naughts (0) upon the paper presented as hereafter described. In other words, if, for example a key in any section except the right hand one when facing the device, be depressed and no key in the several sections to the right be depressed, the device will print the numeral indicated by the key operated, and unless provision be made to obviate it all sections to the right of that will be indicated only by a blank space. If, on the other hand the dogs 104 can be operated to release the several hammers to the right, the several sections to the right will be indicated by a series of naughts (0). Thus, 1000 or 50 or 550 or any similar number. If a key in one section be depressed and no key in the next adjacent section to the right be operated, while the other sections are represented by keys depressed, the result would be similar to the following, 1037, or 505. It is important, therefore, to provide for the release of the hammers coacting with sections to the right of one in which a key is operated in all cases. Provision must be made to secure this result at all times. Fig. 53 is a section in line 53—53 of Fig. 52 and shows one simple and effective means for this purpose. As shown, each dog 104, except the last one to the right, is provided with a laterally extending arm 117 which is adapted to engage a shoulder 118 or equivalent part on the next adjacent dog 104 to the right. Thus, the release of a dog permitting a hammer to operate, will in all cases secure the release of all hammers to the right and insure the printing of the complete amount shown in the several sections.

Any suitable means may be employed to maintain the paper in position and properly present it before the type. In the preferred construction a platen, preferably a carrying roller, 119, extends transversely across the device in a position to coöperate with the type and hammer mechanism before described. (Figs. 1, 2, 3, 4ᵃ, 37 and 38). The roller is rotatably mounted as usual, the plates 120, 120, serving as a support therefor. Any preferred means may be employed to coöperate with the roller to maintain the paper in position. As shown a supplemental roller 121 is provided for this purpose, a spring 122 or equivalent means being provided to resiliently maintain the said roller in position. Means are also provided for rotating the roller 119 a certain distance at each operation of the device thus presenting the paper so as to print a uniform column of numbers. As shown in the drawings the shaft 123 upon which the roller 119 is mounted, also carries a ratchet wheel 124 fixed thereto. A lever 125 connected at one end as at 126 to some suitable part of the device, carries upon its free end a pawl 127 constructed to engage the ratchet 124 as the lever 125 is oscillated. In the preferred form the pawl 127 is pivotally connected to the lever 125 as at 128, a spring 129 or equivalent means serving to insure the engagement of the pawl with the ratchet. (Figs. 23 and 38). If desired the pawl 127 may be provided with a cam section or inclined shoulder 129½ adapted to coöperate with a pin or shoulder 130 on the support 120 or some contiguous part to cause the end of the pawl to be thrown outward when it has sufficiently rotated the roller, to disengage the ratchet. (See Figs. 3 and 38). Thus the paper may be readily removed or the operation reversed for correction or otherwise. To operate the lever 125, a lever 131 is preferably pivoted between its ends as at 132 one end being extended to operate the lever 125 and the other end being extended in proximity to the shaft 76 to be operated at each revolution of said shaft by a cam 133 secured thereto. By this means the roller 119 will be rotated a fixed distance at each revolution of the shaft 76, which as before described is given a complete revolution at each complete oscillation of the hand lever 35. At each operation of the device therefore the paper is shifted for printing. (Figs. 3, 4ᵃ, 23, 24 and 38).

In the preferred form the lever 131 is pinned or otherwise secured to the shaft 132 as by the pin 134 (Fig. 12). A lever 135, provided with a lateral extension 136, is also secured to the same shaft, (Figs. 8, 12, 23 and 24). A lever 137 is pivotally supported between its ends as at 138, and has one end extended to contact with the lateral arm 136 of the lever 135. The other end is extended in line with a vertically movable pin or key 139. A spring 140 tends to normally hold that end of the lever contacting with the lever 135 down, thus forcing the end of the lever 131 down to a point at which it will not be affected by the cam 133, and at the same time forcing the pawl 127 upward, releasing the ratchet therefrom, (Fig. 23). The platen roller 119 and paper carried thereby may then be readily turned either way by means of a knob 141 secured to the shaft carrying the roller for that purpose. The device is not then in position to do effective consecutive printing, since, inasmuch as the paper is not advanced after the first number is printed, all others will be printed at the same point and upon the first impression, confusing the printing beyond comprehension. When it is desired to print, the key 139 is depressed lifting the arm of the lever 137 to release the lever 135 and permitting the cam 133 to contact with and operate the lever 131 and the parts dependent thereon, as before described, (Fig. 24). Any preferred means may be employed to retain the key 139 in the depressed position. As shown the key is provided with a notch 142 near its upper end and a latch 143 provided with a spring 144 is adapted to engage said notch to retain the key in position. (Figs. 25 and 23). The latch may be readily disengaged from the key by pressing it out of the notch by means of the extending end 145 thereof. A spring 146 may also be employed to aid in returning the key 139 to its normal position.

In the preferred form the roller 119 is longitudinally movable in order that wider paper may be used, and several computations be printed on a single sheet, or a single computation be carried through several columns on the same sheet or page. Any preferred means may be employed for this purpose. As shown in the drawings lugs 147 suitably supported by the casing plates or other parts, are provided with anti-friction rollers 148, 148, 149, 149, loosely supported upon the pins or studs 150, (Figs. 2, 3, 4ª and 37). As shown the rollers 148, 148, are placed on a lower horizontal plane than the rollers 149, giving the carriage carrying the platen roller 119, an inclination as indicated. The said carriage is provided with side bars 151, 151, adapted to ride upon rollers 148, 149 to move the roller 119 longitudinally as stated. The side bars 151 are connected by suitable end bars 152, 152. This forms a frame for the plates 120 supporting the roller 119, and also for the parts referred to co-acting therewith. The carriage is preferably provided at each end with a lever 125 pivoted at one end to the ends 152, a bar 153 connecting the free ends of said levers 125. The line of travel of the bar 153, as the carriage is moved back and forth is constantly in line with the movement of the end of the lever 131. As a consequence the coöperation of said lever with the roller 119, is as heretofore described at all points of travel of the carriage. The anti-friction rollers 148, 148, being arranged as shown, the carriage will have a tendency to contact with the frame of the device at that side. The said rollers 148 are therefore, provided with an extending flange 154, (Figs. 2, 3, 4ª and 37) or other equivalent means are provided for preventing such contact and thus permitting the carriage to be readily shifted forward and backward as described.

A suitable guide 155 for the paper is provided preferably substantially as shown, and having an open panel 156 formed therein through which the type are driven by the hammers to reach the paper. (Figs. 1, 2, 3, 4ª, and 8). As shown said guide is secured to and carried by the carriage.

157, 157 are ribbon rollers provided with the usual ribbon 158. Any preferred means may be employed to move the ribbon forward. As shown one of the rollers or spools 157 is mounted on a short shaft 159 which is extended to a point near the shaft 98 and is provided with a crown wheel 160. The shaft 98 is provided with an arm 161 secured thereto, and at each revolution of the shaft 98, the arm 161 contacts with one of the pins or spurs on the wheel 160 rotating the same and the spool 157 a short distance and feeding the ribbon 158 between the type and the roller 119. (Figs. 8, 38, 39 and 40.) A ribbon guide 162 maintains the ribbon in proper position, an open panel formed therein permitting the type to extend therethrough to reach the ribbon. (Figs. 1 and 8.) In the preferred form an auxiliary guide 163, is also employed. (Fig. 1). When thus constructed the ribbon is maintained between the guides 162 and 163, the latter being also provided with an open panel for the type to extend through. The passive spool (shown to the left in Fig. 8) may be provided with a hub 164 or equivalent means so that by means of a key the ribbon may be rewound thereon after it has been exhausted.

In some instances it may be desirable to print without calculating. For this purpose any preferred means may be employed to prevent the computing and indicating mechanism from operating. In the preferred construction the pawl 37 is pivotally supported on the cam 33, as stated. (Figs. 20, 21, 22 and 46). This is preferably accomplished by rotatably mounting a pin 165 on the cam 33 and securing the pawl 37 thereto. An arm or lever 166 is also secured to the pin and extends in line with a lever 167 pivotally supported as at 168. A movable key 169 is positioned to contact with the lever to operate the same. Thus as shown, by depressing the key and elevating the end of the lever the arm 166 and pawl 37 are relieved from the control of the lever (Fig. 20). When the key is at its upper limit, the lever 167 will contact with the arm 166, rotating the pin 165 and turning the pawl 37 so that the latter will not engage the bell crank 30. Hence the shaft 31 will not be moved and the cog-rack 50 will not engage with the pinion 52. The indicating and calculating mechanism will, therefore not be operated. (Fig. 22). The bar 5 has released the latch 6, however, and the bars 14 and 18 are free to operate as usual. The initial movement always causes the cog-rack 17 to first move rearward its limit governed by the bar 14, and the printing mechanism will therefore be operated to show the number indicated on the key board.

A spring 170 tends to restore the lever 166 and its parts to their normal positions when released from the action of the lever 167, and a spring 171 performs a like office for the lever 167, when the key is released from the restraint of the spring latch 172 engaging the notch 173 on the key. Obviously the operation of the key 169 and lever 167 may be reversed by changing the pivotal point 168 beyond the key 169. The form shown is, however, preferred.

In some instances, also, it may be desired to indicate and compute, without printing. This may be accomplished in any preferred manner. In the preferred construction shown, in Figs. 3, 54 and 55, the operation is as follows: Each of the bars, 18, is provided with a stop 183. A shaft 184 is provided with a latch 185 extending across all the bars 18 to engage the stops 183 to prevent the movement of said bars. A crank arm 186 is extended and means are provided for operating the arm to move the latch out of engagement with the stops. In the preferred form the arm 186 is extended in line with the travel of the end of the lever 137 (Fig. 3). As the lever 137 is operated to permit the platen 119 to be rotated as heretofore described, the latch 185 will also be operated permitting the bars 18 unrestricted movement. When, however, the lever 137 is operated to prevent the operation of the platen, the latch 185, will at the same time be placed in a position to lock all the bars 18 against movement and the printing mechanism is therefore, locked against operation although the indicating and computing mechanism may be freely operated. If preferred the shaft 184 may be provided with a plurality of latches 185 as shown in Fig. 55. In such case the latches are preferably all secured to the shaft 184 so as to be operated in unison, and the crank arm 186 is also secured to the shaft to rotate the same for the purpose stated.

It is desirable that all depressed keys 1, shall be automatically released at each operation of the hand lever 35, to restore all the keys to their normal position for the next operation of the device. Any suitable means may be employed for this purpose, that shown being preferred. As shown in Figs. 1, 2, 12, 13, 18 and 19, a transverse shaft 174 is pivotally mounted in supports 175, 175. A series of arms 176 corresponding in number with the key bars 5 are secured to the shaft 174 and extend in proximity to said bars and are adapted to engage the same to longitudinally move them to release all depressed keys. The bars may be provided with laterally extending pins 177 or equivalent parts in the path of the ends of the oscillating arms 176. Upon rotating said shaft, therefore, the arms will be oscillated and the keys be released. An arm 178 is secured to the shaft and is pivotally connected to a bar 179. The other end of the bar is pivotally secured to the oscillating lever 180 extended to co-act with a cam 181 secured to the shaft 76. (Figs. 18 and 19). As the said shaft is given a complete revolution at each operation of the hand lever 35, the operation of the cam 181 will cause the oscillation of the several arms 176 to release the keys. A hand lever 182 may also be secured to the shaft 174 so that by operating said lever the depressed keys may be released without operating the lever 35.

It is obvious various modifications may be made in the operating mechanism without departing from the spirit of my invention. Thus, as shown in Fig. 56, the driving pinion 46, may be replaced by a lever 187, pivotally secured near its center to the arm or lever 45. The cog-racks 17 and 50 being replaced with movable bars 188 and 189 respectively, the latter being provided with a cog-rack to engage the pinion 52 as before. The guides 190, 191 for the bars are extended to the shaft 31 permitting the movement of the parts to engage the cog-rack 189 with the pinion 52 as before. The guide pins or bars 197, 198, maintain the parts in proper relation to one another. The lever 187 is preferably slotted at the ends to receive pins 192, 193, on the bars permitting free movement of the parts. The operation is obvious and is substantially as heretofore described.

As shown in Fig. 57 the segmental cog-racks 17 and 50 are replaced by straight cog-racks 194—195 substantially as shown in Fig. 56, the guides 190 and 191 being also substantially the same. As shown in Fig. 57 the pinion 46 is mounted in a bearing which is longitudinally movable in a slot in the end of the lever 45. Such, or equivalent means, are preferable to permit the pinion to move in a straight line as the end of the lever 45 described the arc of a circle. The operation is obviously substantially as before set forth.

Fig. 58, shows a modification of the indicating arms 56 (see Figs. 26 and 27). As shown the arm 56 is provided with an extension 196, the two forming a bell crank lever, one end of which engages with and is operated by the cam 53. By this construction the pinion 57 and oscillating lever 65 are dispensed with somewhat simplifying the construction. The operation is obviously substantially the same in both cases.

I desire it understood that the terms "indicating" and "computing" and "calculating" are used synonymously in the claims when but one of the terms is employed, and when the claims are not otherwise directed to special features of such mechanism.

What I claim as new and desire to secure by Letters Patent is:

1. In a device of the character described, a translating mechanism comprising a substantially centrally supported pivotal driving member, and means for forcing said member forward and backward, in combination with complemental movable members engaging said driving member on opposite sides of the pivotal support, indicating mechanism and means for transmitting the movement of one of said complemental members to the indicating mechanism.

2. In a device of the kind described, arms 49 and 45, both loosely mounted on a shaft 31, the former being provided with a double segmental cog-rack 50 and the latter with a segmental cog-rack, 17, in combination with a lever 48 secured to the shaft 31 and bearing upon its end a loosely mounted pinion 46, meshing with the cog-racks 50—17, a pinion 52 adapted to be engaged by the cog-rack 50, indicating mechanism, means for transmitting the movement of the pinion 52 to the indicating mechanism, and means for laterally moving the shaft 31 to engage the cog-rack 50 with the pinion 52, and means for partially rotating the said shaft.

3. In a device of the kind described, a longitudinally movable bar, and means for regulating the travel of said bar, in combination with two complemental movable members one of which is connected with said bar, a pivotally supported driving member engaged by said movable members on opposite sides of its center, and means for operating said driving member.

4. In a device of the kind described, a longitudinally movable bar and means for regulating the travel of said bar at will, in combination with an independently operated driving pinion, two complemental cog-rack members meshing with said pinion on opposite sides of its center, one of said members being controlled by the travel of the movable bar, and means for operating said driving pinion.

5. In a device of the kind described, a longitudinally movable bar and means for regulating the travel of said bar at will, in combination with a movable cog-rack connected to said bar, a driving pinion meshing with said cog-rack, a double cog-rack on one side meshing with said pinion and on the other side meshing with and driving a pinion, and means for operating the driving pinion whereby the rotation of the driven pinion is governed by the distance traveled by said bar.

6. In a device of the kind described, an oscillating arm having mounted thereon a freely rotating pinion, and means for oscillating the said arm, in combination with a movable cog-rack meshing with said pinion, a longitudinally movable bar connected to said cog-rack, means for regulating the travel of said bar, and a double cog-rack on one side meshing with said pinion and on the other side with a pinion to drive it.

7. In a device of the kind described, an oscillating arm or lever having mounted thereon a freely rotating pinion, and means for oscillating said lever in combination with a movable cog-rack meshing with said pinion, a longitudinally movable bar connected to said cog-rack, means for regulating the travel of said bar at will, a double cog-rack on one side meshing with said pinion and on the other side with a second pinion, and means for engaging and disengaging said cog-rack and second pinion at will.

8. In a device of the kind described, a longitudinally movable bar provided with a plurality of stops, and means coöperating with said stops to regulate the travel of said bar at will, in combination with a movable cog-rack controlled by the movement of said bar, a driving pinion meshing with said cog-rack, a double cog-rack on one side meshing with the said pinion and on the other adapted to mesh with a second pinion and means for operating the driving pinion.

9. In a device of the kind described, a longitudinally movable bar provided with a plurality of stops, and a plurality of keys constructed to coöperate with said stops to regulate the travel of said bar at will, in combination with a movable cog-rack controlled by the travel of said bar, a driving pinion meshing with said cog-rack, a double cog-rack, on one side meshing with said pinion and on the other side adapted to mesh with a second pinion, and means for operating the driving pinion.

10. In a device of the kind described, an oscillating arm or lever having mounted thereon a freely rotating pinion, and means for oscillating said arm, in combination with an oscillating segmental cog-rack meshing with said pinion, a longitudinally movable bar provided with a plurality of stops connected with said cog-rack, a plurality of keys constructed to coöperate with said stops to regulate the travel of the bar at will, an oscillating segmental double cog-rack on one side meshing with said pinion and on the other side adapted to mesh with a second pinion to drive it.

11. In a device of the character described, a longitudinally movable bar, and means for regulating the travel of said bar at will, in combination with a movable cog-rack connected with and controlled by said bar, a driving pinion meshing with said cog-rack, a double cog-rack on one side meshing with said pinion and on the other side adapted to mesh with and drive a second pinion, means for operating the driving pinion, printing mechanism, and a movable bar 18, connected with the longitudinally movable bar and controlling the printing mechanism.

12. In a device of the kind described, an oscillating arm or lever having mounted thereon a freely rotating pinion, means for oscillating said lever, an oscillating segmental cog-rack meshing with said pinion and a movable double cog-rack meshing on one side with the pinion and on the other side adapted to mesh with and drive a second pinion, in combination with a longitudinally movable bar connected with and controlled by the oscillation of the segmental cog-rack, means for regulating the travel of said bar at will, printing mechanism, and a movable bar 18, connected with the longitudinally movable bar and controlling the printing mechanism.

13. In a device of the kind described, an oscillating arm or lever having mounted thereon a freely rotating pinion, means for oscillating said lever, an oscillating segmental cog-rack meshing with said pinion, and a movable double cog-rack on one side meshing with the pinion and on the other side adapted to mesh with and drive a second pinion in combination with a longitudinally movable bar connected with and controlling the oscillation of the segmental cog-rack, said bar being provided with a plurality of stops, a plurality of keys coöperating with said stops to regulate the travel of said bar at will, printing mechanism and a movable bar 18 connected with the longitudinally movable bar and controlling the printing mechanism.

14. In a device of the kind described, a longitudinally movable bar, means for regulating the travel of said bar at will, in combination with two complemental movable members one of which is connected to said bar, a pivotally supported driving member engaged by said movable members on opposite sides of its center, means for operating said driving member, and a bar 18, slidingly engaged with the movable bar, whereby said bars are permitted a limited movement upon one another, substantially as described.

15. In a device of the kind described, a longitudinally movable bar and means for regulating the travel of said bar at will, in combination with a movable cog-rack connected with and controlled by said bar, a driving pinion meshing with said cog-rack, a double cog-rack, on one side meshing with said pinion, and on the other side adapted to mesh with and drive a second pinion, means for operating the driving pinion, and a movable bar 18 slidingly engaged with the longitudinally movable bar to permit a limited movement of one bar on the other.

16. In a device of the kind described, a longitudinally movable bar 14 and means for regulating the travel of said bar, in combination with a movable cog-rack connected with and controlled by said bar, a driving pinion meshing with said cog-rack, a double cog-rack on one side meshing with said pinion and on the other adapted to mesh with and drive a second pinion, means for operating the driving pinion, a movable bar 18 slidingly engaged with the bar 14 to permit a limited movement one upon the other, and provided with a stop and latch device whereby the bar 18, may be held against longitudinal movement at will.

17. In a device of the kind described, a longitudinally movable bar 14 and means for regulating the travel of said bar, in combination with a movable cog-rack connected with and controlled by said bar a driving pinion meshing with said cog-rack, a double cog-rack, on one side meshing with said pinion and on the other adapted to mesh with and drive a second pinion, means for operating the driving pinion, a movable bar 18, engaged with said bar 14 by a slot and pin connection, and means for locking the bar 18 against the movement of the bar 14.

18. In a device of the character described, a longitudinally movable bar 14 provided with a plurality of stops, a plurality of keys constructed to coöperate with said stops to regulate the travel of said bar at will, a longitudinally movable lock-bar 5 arranged to retain a key in a depressed position, whereby said bar 5 is longitudinally moved, in combination with two complemental movable members, one of which is connected with said bar 14, a pivotally supported driving member engaged by said movable members on opposite sides of its center and means for operating said driving member.

19. In a device of the kind described, a longitudinally movable bar 14, provided with a plurality of stops, a plurality of keys constructed to coöperate with said stops to regulate the travel of said bar at will, a longitudinally movable bar 5 arranged to retain a key in depressed position, whereby said bar 5 is longitudinally moved in combination with a movable cog-rack connected with and controlled by said bar 14, a driving pinion 46 meshing with said cog-rack, a double cog-rack on one side meshing with said pinion and on the other adapted to engage with and drive a pinion 52 and means for operating the pinion 46.

20. In a device of the kind described, a longitudinally movable bar 14, provided with a plurality of stops, a plurality of keys arranged to coöperate with said stops to regulate the travel of said bar at will, a longitudinally movable bar 5 arranged to retain a key in a depressed position whereby said bar 5 is longitudinally moved and temporarily retained, in combination with a movable cog-rack connected with and controlled by said bar 14, a driving pinion 46 meshing with said cog-rack, a double cog-rack on one side meshing with said pinion and on the other adapted to engage with and drive a pinion 52, means for operating the pinion 46, a longitudinally movable bar 18, slidingly engaged with the bar 14, a stop on said bar 18, and a latch arranged to engage with said stop to hold said bar against movement, and to be disengaged from said stop by the movement of the bar 5.

21. In a device of the kind described, a movable bar 14 provided with a plurality of stops, a plurality of keys 1, arranged to coöperate with the stops to regulate the travel of said bar at will, a movable locking bar 5 and a latch 6 adapted to be disengaged by the movement of the bar 5, in combination with a cog-rack 17 connected with and controlled by the bar 14, a driving pinion 46 meshing with the cog-rack 17, a double cog-rack 50 meshing with said pinion on one side and on the other adapted to be engaged with and drive a pinion 52, means for operating the driving pinion 46, a longitudinally movable bar 18 slidingly engaged with the bar 14, provided with a stop 26, adapted to be engaged by the stop 6.

22. In a device of the kind described, a movable bar 14, provided with a plurality of stops, a plurality of depressible keys 1, arranged to coöperate with said stops to limit the travel of the bar, a resiliently retained lock-bar 5 adapted to retain said keys in their depressed position, a latch 6 adapted to be operated by the movement of the bar 5, a cog-rack 17 connected with the bar 14, a driving pinion 46 meshing with said cog-rack, a double cog-rack 50, on one side meshing with the pinion 46 and on the other adapted to engage a pinion 52, and means for operating the driving pinion in combination with printing mechanism, a movable bar 18, controlling the printing mechanism and slidingly engaged with the bar 14, and a stop 26 on said bar 18 arranged to be engaged by the latch 6 to hold the bar 18 against longitudinal movement, substantially as described.

23. In a device of the kind described, a driving member pivotally supported near its center, and means for independently moving the driving member forward and backward in combination with two complemental members engaging said driving member on opposite sides of its pivotal support, a longitudinally movable bar controlled by the movement of one of said members, means for controlling the travel of said bar at will indicating mechanism and means for transmitting the movement of the other of said complemental members to the indicating mechanism.

24. In a device of the kind described, a driving member pivotally supported near its center and means for moving the driving member forward and backward, in combination with two complemental movable members engaging said driving member on opposite sides of its pivotal support, computing and indicating mechanism, and means for transmitting the movement of one of said complemental members to the computing and indicating mechanism.

25. In a device of the kind described, a driving pinion and means for operating said pinion, in combination with two complemental movable cog-racks meshing with the pinion on the opposite sides of its center, one of said cog-racks being provided with an external cog-rack, a pinion 52 adapted to be engaged with and operated by said external cog-rack, and indicating mechanism driven by said pinion 52.

26. In a device of the kind described, a driving pinion and means for operating said pinion, in combination with two complemental movable cog-racks, meshing with the pinion on opposite sides of its center, one of said cog-racks being provided with an external cog-rack, a pinion 52 adapted to be engaged with and operated by said external cog-rack, and computing and indicating mechanism driven by said pinion 52.

27. In a device of the kind described a pinion loosely mounted on an oscillating arm or lever, and means for operating said arm, in combination with two movable cog-racks meshing with said pinion on opposite sides of its center, one of said cog-rack members being provided with an external cog-rack, a pinion 52 adapted to be engaged and rotated thereby and indicating mechanism driven by said pinion.

28. In a device of the kind described, a pinion loosely mounted on an oscillating arm or lever, and means for operating said arm, in combination with two movable cog-racks meshing with said pinion on opposite sides of its center, one of said cog-rack members being provided with an external cog-rack, a pinion 52, adapted to be engaged and rotated thereby and computing and indicating mechanism driven by said pinion.

29. In a device of the kind described, key mechanism, a pinion loosely supported on an oscillating arm or lever, and means for operating said arm, in combination with two segmental cog-racks meshing with said pinion on opposite sides of its center, one of said cog-rack members being provided with an external cog-rack, a pinion adapted to be engaged by the external cog-rack, said pinion being normally out of engagement with said cog-rack, indicating devices, and means for engaging said cog-rack, and pinion.

30. In a device of the kind described, key mechanism, an arm 48 secured to and oscillated by a shaft 31 and carrying upon its end a rotatable pinion 46, and means for partially rotating said shaft, in combination with segmental cog-racks 17—50 meshing therewith and carried by oscillating arms 45—49 loosely mounted on said shaft 31, a shaft 51 having loosely mounted thereon a pinion 52 arranged to be engaged by the external cog-rack 50, but normally out of engagement therewith, associated indicating devices, and means for moving said shaft 31 to engage the cog-rack 50 with the pinion 52.

31. In an adding machine the combination with actuating means, of indicating means comprising a series of indicating devices carrying characters, and oscillating arms carrying the said devices, cam actuated devices for moving the arms, and carrying means associated with and governed by said cam actuated devices.

32. In a device of the kind described, an oscillating arm 56 provided with a section having indicating characters formed thereon, in combination with a cam 53, means for rotating said cam measured distances at will, mechanism for transmitting the operation of the cam to the arm 56 to oscillate the same and present the characters to view, and carrying mechanism associated with and governed by said cam.

33. In a device of the kind described, an oscillating arm 56 provided with a section 58 having indicating characters formed thereon, and a pinion 57 connected to said arm and by its operation adapted to oscillate the same, in combination with a cog-rack engaging the pinion 57 and means for longitudinally moving the cog-rack measured distances, comprising a cam and carrying means associated with and governed by the cam.

34. In a device of the kind described, an oscillating arm 56 provided with a section 58, having indicating characters formed thereon, and a pinion 57 connected to said arm and adapted by its rotation to oscillate the same, in combination with an oscillating arm 65, provided with a cog-rack 67, engaging the pinion 57, and a cam 53 engaging the arm 65 and means for rotating the cam measured distances, and carrying mechanism associated with and governed by the cam.

35. In a device of the kind described, an oscillating arm 56, provided with an indicating section, and a pinion arranged to oscillate said arm, in combination with a cog-rack engaging said pinion, a cam 53 engaging the cog-rack to longitudinally move the same, a pinion 52 arranged to rotate the cam, means for rotating the pinion 52 measured distances, and carrying means associated with and governed by the cam.

36. In a device of the kind described, an oscillating arm 56, provided with a section 58 having indicating characters formed thereon and a pinion 57 connected to said arm, in combination with an oscillating lever 65 provided with a cog-rack 67 engaging the pinion 57, a cam 53 arranged to oscillate the lever 65, a pinion 52 arranged to rotate the cam, means for rotating the pinion 52 measured distances, and carrying mechanism associated with and governed by the cam.

37. In a device of the kind described, a plurality of oscillating arms 56, each provided with a section, said sections being arranged to indicate the order of their values, having indicating characters formed thereon, and means for oscillating said arms progressively measured distances to aline and present said characters to view, in combination with means for operating the indicator arm of a higher order to indicate a complete cycle of the indicator of the next lower order.

38. In a device of the kind described, a plurality of oscillating arms 56 each provided with a section having indicating characters formed thereon, said sections being arranged to indicate the order of their values, and means for oscillating said arms progressively measured distances to aline and present said characters to view, in combination with means for independently operating each indicator arm and means for automatically operating the indicator of a higher order to indicate each complete cycle of the indicator of the next lower order.

39. In a device of the kind described, a plurality of oscillating indicator arms arranged to indicate the order of their values, and means for independently oscillating said arms progressively measured distances, in combination with means for automatically operating the indicator of a higher order to indicate each complete cycle of that of the next lower order, and means for canceling the amount indicated and resetting said indicators.

40. In a device of the kind described, a shaft 51, provided with engaging means, and means for rotating the shaft at will, in combination with a plurality of cams loosely mounted on the shaft, provided with means for engaging the shaft when the latter is rotated, means for independently rotating said cams, and a plurality of indicating members operated by said cams whereby upon rotating the shaft the several cams will be alined and rotated in unison.

41. In a device of the kind described, a shaft 51 provided with a longitudinal shoulder, and means for rotating said shaft at will, in combination with a plurality of cams 53 loosely mounted on said shaft, each of said cams being provided with a pawl 89 adapted to engage the shoulder when the shaft is rotated in opposition to the pawls, means for independently rotating the cams, and means for rotating the shaft, whereby the several cams will be rotated in unison.

42. In a device of the kind described, a plurality of oscillating arms 56 provided with indicating sections, a plurality of cams 53, each provided with a pawl, 89, means for independently rotating said cams, and means for transmitting movement of the cams to the arms to oscillate them, in combination with a shaft 51 upon which said cams are loosely mounted having a longitudinal shoulder formed thereon adapted to engage the pawls, and means for rotating the shaft in opposition to the pawls.

43. In a device of the kind described the combination of the following elements, a plurality of arms 56, each provided with an indicating section and a pinion 57 arranged to oscillate said arm, a plurality of oscillating levers 65 each provided with a cog-rack 61, engaging a pinion 57, a shaft 67 provided with a longitudinal shoulder, a plurality of cams 53, loosely mounted on the shaft and each provided with a pawl adapted to engage the shoulder when the shaft is rotated in opposition thereto, each of said cams being adapted to engage with and oscillate one of the levers 65, means for independently operating each of said cams, and means for rotating said shaft to rotate them in unison.

44. In a device of the kind described, a plurality of oscillating levers 56 converging toward a common center, and provided on their ends with indicating sections, whereby the indicating sections are placed in convenient proximity to one another, in combination with means for oscillating said levers to display the indicating characters, comprising cams, and means governed by the cams for moving the adjacent indicating sections.

45. In a device of the kind described, a plurality of oscillating levers converging toward a common center and provided on their ends with indicating sections, whereby the indicating sections are placed in convenient proximity to one another, in combination with a pinion 57 for each lever 56 arranged to control the operation of said arm, and oscillating racks for independently rotating said pinions measured distances, and carrying mechanism governed by said rotating means.

46. In a device of the kind described, a plurality of oscillating arms or levers 56, each provided with an indicator section and a pinion 57, oscillating levers 65, each provided with a cog-rack 67, engaging a pinion 57, a plurality of cams 53, each adapted to control the oscillation of the lever 65, each cam of a higher order being provided with a ratchet wheel 54, and pinion 52 controlling the independent rotation of the cams 53, in combination with levers 71 each adapted to engage with and rotate one of the ratchet wheels 54, a lock 70 for each lever 71 provided with a trip adapted to disengage the lever as the indicating member of the next lower order reaches the limit of its movement, movable cog-racks engaging the pinions 52, and means for independently operating the cog-racks.

47. In a device of the kind described, a plurality of oscillating levers 56, each provided with an indicator section and a pinion 57, oscillating levers 65, each provided with a cog-rack 67 engaging a pinion 57, a plurality of cams 53 each adapted to control the oscillation of a lever 65, each cam of a higher order being provided with a ratchet wheel 54 and pinions 52 controlling the independent rotation of the cams 53, in combination with levers 71, each adapted to engage with and rotate one of the ratchet wheels, 54, a lock 70 for each lever 71 provided with a trip adapted to disengage the lever as the indicator of the next lower order reaches its limit of movement, movable cog-racks adapted to engage the pinions 52, but normally out of engagement therewith, means for engaging and disengaging said cog-racks with said pinions 52, and means for independently operating the said cog-racks.

48. In a device of the kind described, computing and indicating mechanism comprising the combination of the following elements, a plurality of indicating members arranged adjacent to one another to indicate the order of their values, a plurality of cams 53 arranged to independently operate said indicating members, each of said cams being provided with a driving pinion 52 and each of the cams of the higher order being provided with a ratchet 54 arranged to rotate the cam, a plurality of cog-racks each adapted to engage a pinion 52 but normally out of engagement therewith, means for independently engaging each of said cog-racks with its pinion and operating the same, a plurality of levers 71 each adapted to engage a ratchet 54 to rotate the same one step in its revolution, each lever 71 being provided with a lock 70 to hold the same out of contact with the ratchet, a lock 70 to hold the same out of contact with the ratchet, a trip 66 arranged to release a lever 71 as an indicating member of a lower order completes the cycle of its movement, each lever 71 being provided with a cam 77 arranged to temporarily hold said lever 71 out of engagement with the ratchet 54, the rotation of said cams 77 being timed to release the lever only after the cog-rack is disengaged from the pinion 52, substantially as described.

49. In a device of the kind described, a shaft 29, having mounted thereon at one end the bell crank lever 30 and at the other end a lever 32, one end of said bell crank and the lever 32 providing a bearing for the shaft 31, and a lever 40 secured to the shaft 31, in combination with a rotatable shaft 34 provided with means for partially rotating said shaft, a cam 33 secured to said shaft 34 and operated thereby, said cam being constructed to engage the free end of the arm 40 to partially rotate the shaft 31, and means for depressing the free arm of the bell crank lever, substantially as described.

50. In a device of the kind described, a shaft 29, having mounted thereon at one end a bell crank lever 30 and at the other end a lever 32, one end of said bell crank and said lever 32 providing a bearing for a shaft 31, and a lever 40 secured to the shaft 31, in combination with a rotatable shaft 34 provided with means for partially rotating said shaft, a cam 33 secured to said shaft 34 and operated thereby, said cam being constructed to engage with the free end of the arm 40 to partially rotate the shaft 31, and means carried by said arm to depress the free arm of the bell crank 30 to lift the shaft 31 out of its normal position; substantially as described.

51. In a device of the kind described, a shaft 29 having mounted upon one end thereof a bell crank lever 30 and upon the other end a lever 32, said lever 32 and one end of the bell crank lever providing a bearing for the shaft 31, and a lever 40 secured to the shaft 31, in combination with a rotatable shaft 34 provided with means for partially rotating said shaft, a cam 33 secured to said shaft 34 constructed to engage the free end of the arm 40 to partially rotate the shaft 31, means for depressing the free arm of the bell crank 30, a latch 36 adapted to engage the bellcrank to hold the same in depressed position, and means for releasing the latch in the reverse movement of the parts, substantially as described.

52. In a device of the kind described, a shaft 29 having mounted upon one end thereof a bell crank lever 30 and upon the other end a lever 32, said lever 32 and one end of the bell crank providing a bearing for the shaft 31, and a lever 40 secured to the shaft 31 in combination with means for depressing the free arm of the bell crank lever to move the shaft 31 out of its normal position, and means for oscillating the lever 40, substantially as described.

53. In a device of the kind described, a shaft 29 having mounted thereon a bell crank lever 30 and a lever 32, one end of the bell crank and said lever 32 providing a bearing for the shaft 31 in combination with means for depressing the free arm of the bell crank to move the shaft 31 out of its normal position, and means for partially rotating said shaft 31, substantially as described.

54. In a device of the kind described, a shaft 29, having mounted thereon a bell crank lever 30 and a lever 32, one end of said bell crank 30 and said lever 32 forming a bearing for the shaft 31, and a lever 40 secured to the shaft 31, in combination with a rotatable shaft 34 provided with means for partially rotating said shaft, a cam 33 secured to the shaft 34, and constructed to engage the free end of the arm 40 to partially rotate the shaft 31, a dog 37 secured to the cam and arranged to engage the end of the bell crank lever 30 to depress the same, and a latch 33 adapted to engage the end of the bell crank when so depressed, substantially as described.

55. In a device of the kind described, a shaft 29 having mounted thereon a bell crank lever and a lever 32, said lever 32 and one end of the bell crank providing a bearing for a shaft 31, and a lever 40 secured to the shaft 31, in combination with a rotatable shaft 34 provided with means for partially rotating said shaft, a cam 33 secured to the shaft 34, constructed to engage the free end of the arm 40 to partially rotate the shaft 31, and means carried by said cam to depress the free end of the bell crank lever 30 to lift the shaft 31 out of its normal position, or at will to permit said cam to pass by said bell crank without operating the same, substantially as described.

56. In a device of the kind described, a shaft 29 having mounted thereon a bell crank lever 30 and a lever 32, said lever 32 and one end of the bell crank providing a bearing for the shaft 31, and a lever 40 secured to said shaft 31, in combination with a rotatable shaft 34 provided with means for partially rotating said shaft, the cam 33 secured to said shaft 34 constructed to engage with the free end of the arm 40 to partially rotate the shaft 31, a latch 36 constructed to engage the free end of the bell crank lever to hold the same in a depressed position, a dog 37 pivotally supported to the cam 33 and normally arranged to engage the free end of the bell crank 30 to depress the same, a lever arranged to control the operation of the dog 37, and means for operating said lever, substantially as described.

57. In a device of the kind described, a shaft 29 having mounted thereon a bell crank lever 30 and the lever 32, said lever 32 and one end of said bell crank providing a bearing for the shaft 31, and a lever 40 secured to the shaft 31, in combination with a rotatable shaft 34 provided with means for partially rotating said shaft, a cam 33 operated by said shaft and constructed to engage the free end of the lever 40 to partially rotate the shaft 31, the latch 36, the dog 37, and a trip 39 adapted upon the reverse movement of the cam to engage the latch 36 to release the bell crank lever, substantially as described.

58. In a device of the kind described, a shaft 29, having mounted thereon a bell crank lever 30, and a lever 32, said lever 32 and one end of the bell crank forming a bearing for the shaft 31, and a lever 40 secured to the shaft 31, in combination with a rotatable shaft 34 provided with means for partially rotating said shaft, a cam 33 secured to said shaft and constructed to operate the lever 40 to partially rotate the shaft 31, a latch 36, a dog 37, provided with an extension 166 controlling the operation of said dog, a pivoted lever 167 arranged to engage the end of the extension 166, and a movable key arranged to operate the lever 167, substantially as described.

59. In a device of the kind described, a shaft 29, having mounted thereon a bell crank lever 30, and a lever 32, said lever 32 and one end of the bell crank forming a bearing for the shaft 31, and a lever 40 secured to the shaft 31, in combination with a rotatable shaft 34 provided with means for partially rotating said shaft, a cam 33 secured to the shaft 34 and operated thereby said cam being constructed to operate the lever 40 to partially rotate the shaft 31, the latch 36, the dog 37 provided with an extension 166 controlling the operation of said dog, a lever 167 arranged to engage the extension, a movable key arranged to operate the lever 167, and a trip 39 adapted on the reverse movement to disengage the latch 36 from the end of the bell crank lever, substantially as described.

60. In a device of the kind described, a longitudinally movable bar 14, means for regulating its limit of travel at will, means for positively moving said bar its limit, indicating mechanism, and means for operating said mechanism governed by the said bar, in combination with printing mechanism, a movable bar 18 slidingly engaging the bar 14 and limited in its movement thereby, and means for transmitting the movement of the bar 18 to the printing mechanism.

61. In a device of the kind described, a longitudinally movable bar 14, means for regulating its limit of movement at will, means for positively moving said bar its limit, computing and indicating mechanism, and means for operating said mechanism governed by the travel of said bar, in combination with printing mechanism, a movable bar 18 slidingly engaging the bar 14 and limited in its movement thereby, and means for transmitting the movement of the bar 18 to the printing mechanism.

62. In a device of the kind described, a longitudinally movable bar 14, means for regulating its limit of travel at will, means for positively moving said bar its limit, a movable cog-rack connected with said bar, a driving pinion engaging said cog-rack, means for operating the driving pinion, indicating mechanism, and means for transmitting the movement of the cog-rack to the indicating mechanism, in combination with printing mechanism, a movable bar 18 slidingly engaging the bar 14 and limited in its movement thereby, and means for transmitting the movement of the bar 18 to the printing mechanism.

63. In a device of the kind described, a longitudinally movable bar 14, provided with means for regulating its limit of travel at will, a movable cog-rack connected with said bar, a driving pinion engaging said cog-rack, means for operating the cog-rack, computing and indicating mechanism and means for transmitting the movement of the cog-rack to the indicating mechanism, in combination with the printing mechanism, a movable bar 18, a sliding connection between the same and the bar 14, whereby the bar 18 is limited in its movement, and means for transmitting the movement of the bar 18 to the printing mechanism.

64. In a device of the kind described, a longitudinally movable bar 14, means for regulating the travel of said bar at will, a movable cog-rack connected with said bar, a driving pinion engaging said cog-rack, and means for operating said driving pinion, in combination with indicating mechanism, means for transmitting the movement of the cog-rack to the indicating mechanism to govern the operation of the same, printing mechanism, a longitudinally movable bar 18 slidingly connected with the bar 14, and limited in its movement thereby, means for operating said bar 18, and means for transmitting the movement of said bar to the printing mechanism.

65. In a device of the kind described, a longitudinally movable bar 14, means for regulating the travel of said bar at will, a movable cog-rack connected with said bar, a driving pinion engaging said cog-rack and means for operating the driving pinion, in combination with computing and indicating mechanism, means for transmitting the movement of the cog-rack to the computing and indicating mechanism to govern the operation of the same, printing mechanism, a longitudinally movable bar 18 slidingly connected with the bar 14 and limited in its movement thereby, means for operating said bar 18, and means for transmitting the movement of said bar to the printing mechanism.

66. In a device of the kind described, a longitudinally movable bar 14 provided with means for regulating the limit of travel of said bar at will, a movable cog-rack connected with said bar, a driving pinion engaging said cog-rack, a double cog-rack on one side meshing with said driving pinion and on the other side adapted to engage a second pinion, computing and indicating mechanism, means for transmitting the operation of the said second pinion to said mechanism, and means for operating the driving pinion, in combination with a bar 18 connected with the movable bar 14 to limit the travel of the former, printing mechanism, and means for transmitting the longitudinal movement of the bar 18 to the printing mechanism.

67. In a device of the kind described, a longitudinally movable bar 14 provided with means for regulating the limit of travel of said bar at will, a movable cog-rack connected with said bar, a driving pinion engaging said cog-rack, a double cog-rack on one side meshing with said driving pinion and on the other side adapted to engage a second pinion, indicating mechanism, means for transmitting the operation of said second pinion to said mechanism, and means for operating the driving pinion, in combination with a bar connected with the movable bar 14, to limit the travel of the former, printing mechanism and means for transmitting the longitudinal movement of the bar 18 to the printing mechanism.

68. In a device of the kind described, a longitudinally movable bar 14 provided with means for regulating its limit of travel at will, a movable cog-rack connected with said bar, a driving pinion engaging said cog-rack, a double cog-rack on one side meshing with said driving pinion and on the other side adapted to engage with a pinion 52, computing and indicating mechanism, means for transmitting the operation of the pinion 52 to said mechanism, and means for operating the driving pinion, in combination with the bar 18 slidingly connected with the movable bar 14 and limited in its movement thereby, means for operating said bar 18, printing mechanism, and means for transmitting the longitudinal movement of the bar 18 to the printing mechanism.

69. In a device of the kind described, a longitudinally movable bar 14 provided with means for regulating its limit of travel at will, computing and indicating mechanism, means for operating the said computing and indicating mechanism, and controlling mechanism connecting the movable bar with the computing and indicating mechanism, whereby the operation of the latter is regulated by the movement of the former, in combination with printing mechanism, a longitudinally movable bar 18 slidingly connected to the movable bar 14 permitting a limited movement of one bar upon the other, and means for transmitting the movement of the bar 18 to the printing mechanism.

70. In a device of the character described, a longitudinally movable bar 14 provided with means for regulating the movement of travel at will, indicating mechanism, means for operating said indicating mechanism, and mechanism connecting the movable bar with the indicating mechanism, whereby the operation of the latter is regulated by the movement of the former, in combination with printing mechanism, a longitudinally movable bar 18 slidingly connected with the bar 14 to permit a limited movement of one bar upon the other, means for operating the bar 18, means for transmitting the movement of said bar to the printing mechanism, and means for locking said bar 18 against movement at will, substantially as described.

71. In a device of the kind described, a longitudinally movable bar 14 provided with means for regulating its limit of travel at will, computing and indicating mechanism, means for operating said computing and indicating mechanism, and mechanism connecting the movable bar with the computing and indicating mechanism whereby the operation of the latter is regulated by the movement of the former, in combination with printing mechanism, a longitudinally movable bar 18 slidingly connected with the bar 14 to permit a limited movement of one bar upon the other, means for operating the bar 18, means for transmitting the movement of said bar to the printing mechanism, and means for locking said bar 18 against movement at will, substantially as described.

72. In a device of the kind described, computing and indicating mechanism, comprising a plurality of indicating members arranged adjacent to one another in the order of their numerical values, and a plurality of cams arranged to independently and progressively operate said indicating members in combination with means for independently operating said cams measured distances, and means for automatically operating a cam of a higher order to indicate a complete cycle of a member of the next lower order, substantially as described.

73. In a device of the kind described, computing and indicating mechanism, comprising a plurality of indicating members arranged adjacent to one another, to indicate the order of their numerical values, a plurality of cams arranged to independently and progressively operate said indicating members, each cam controlling a higher order being provided with and rotated by a ratchet wheel provided with a number of teeth corresponding with the number of units necessary to complete a cycle of its indicating member, in combination with means for independently rotating said cams measured distances, levers adapted to engage said ratchets, and means for releasing and operating the lever of the next higher order to rotate its ratchet one step in its revolution as the member of the next adjacent lower order completes its cycle.

74. In a device of the kind described, computing and indicating mechanism comprising a plurality of indicating members arranged adjacent to one another to indicate the order of their numerical values, a plurality of cams 53 arranged to independently and progressively operate said indicating members, each cam of a higher order being provided with and rotated by a ratchet wheel 54 provided with a number of teeth corresponding with the number of units necessary to complete a cycle of the indicating member controlled by it, and means for rotating said cams and ratchet wheels measured distances, in combination with levers 71 each constructed to engage a ratchet wheel to rotate the same one step in its revolution, each lever 71 being provided with a lock constructed to normally hold the same out of contact with the ratchet wheel, and means for disengaging said lock from the lever as the indicating mechanism of a lower order completes its cycle, whereby the cam of the next adjacent higher order is rotated one step in its revolution.

75. In a device of the kind described, computing and indicating mechanism comprising a plurality of indicating members arranged adjacent to one another to indicate the order of their numerical values, a plurality of cams 53 arranged to independently and progressively operate said indicating members, each of said cams of a higher order being provided with and rotated by a ratchet wheel 54 provided with a number of teeth corresponding with the number of units necessary to complete a cycle of the indicating member controlled by it, said cams being provided with pawls 89, in combination with a shaft 51 provided with an engaging shoulder 88 upon which shaft said cams are loosely mounted, means for independently rotating the cams and means for rotating the shaft in opposition to said pawls whereby said cams will first be alined and then rotated in unison.

76. In a calculating machine the combination with a printing mechanism, comprising type bars, spring actuated hammer elements and a platen, of means for tensioning the springs of the hammer elements, and permitting the active printing movement thereof, locks positioned to prevent the movement of the hammers, pivoted trips for releasing the locks by and upon the movement of the type bars, and means for moving the type bars.

77. In a calculating machine the combination with a printing mechanism, comprising type bars, spring actuated hammer elements and a platen, of means for tensioning the springs of the hammer elements, and permitting the active printing movement thereof, spring actuated locks positioned to prevent the movement of the hammers, pivoted trips for releasing the locks by and upon the movement of the type bars, and means for moving the type bars.

78. In a calculating machine the combination with a printing mechanism, comprising type bars, spring actuated hammer elements and a platen, of means for tensioning the springs of the hammer elements, and permitting the active printing movement thereof, spring actuated locks positioned to prevent the movement of the hammers, spring actuated pivoted trips for releasing the locks by and upon the movement of the type bars, and means for moving the type bars.

79. In a calculating machine, the combination of computing, and indicating mechanism therefor, with printing mechanism provided with movable type and actuating hammers therefor, a relatively fixed keyboard provided with a set of controlling keys common to both, and means for separating at will the computing and indicating mechanism from the printing mechanism, to permit the actuating of the latter without operatively actuating the former.

80. In a device of the kind described, a longitudinally movable bar, means for regulating its limit of travel at will, means for moving said bar its limit, computing mechanism, and means for actuating said mechanism controlled by said bar, in combination with printing mechanism, actuating mechanism therefor also controlled by said bar, and means for disconnecting either of said mechanism from its controlling bar to permit the independent operation of the other.

81. In a device of the kind described, a longitudinally movable bar, means for regulating its limit of travel at will, means for moving said bar its limit, computing mechanism, and means for actuating said mechanism controlled by said bar, in combination with printing mechanism, means for actuating said mechanism also controlled by said bar, and means for disconnecting the computing mechanism from the controlling bar to permit the independent operation of the printing mechanism.

82. In a device of the kind described, a platen, a movable type-carrying bar provided with a plurality of movable type arranged to be presented against the platen, a longitudinally bar 18 arranged to control the movement of the type-carrying bar 27, means for controlling the longitudinal movement of the bar 18, at will, and means for locking said bar against longitudinal movement, in combination with a hammer arranged to set one of said type against the platen, and spring actuated means for operating said hammer, means governed by the bar for retaining the hammer against movement, and pivoted tripping means interposed between the bar and lock, substantially as described.

83. In a device of the kind described, a platen, a movable type carrying bar provided with a plurality of movable type arranged to be presented to said platen, in combination with a hammer arranged to drive one of said type against said platen, a rotatable cam arranged to control the operation of the hammer, and means governed by the bar for retaining the hammer against movement, substantially as described.

84. In a device of the kind described, a platen, a movable type carrying bar provided with a plurality of movable type adapted to be presented to said platen, and means for moving said type carrying bar, in combination with a spring operated hammer adapted to set one of said type against said platen, a cam controlling the movement of said hammer, means rotating said cam, and means governed by the bar for retaining the hammer against movement, substantially as described.

85. In a device of the kind described, a platen, a movable type carrying bar provided with a plurality of movable type adapted to be presented to said platen, and means for moving the type carrying bar, in combination with a hammer arranged to set one of said type against said platen, a rotatable cam arranged to control the operation of the said hammer, means for rotating said cam, and a lock controlled by the bar adapted to lock the hammer against the control of said cam, substantially as described.

86. In a device of the kind described, a platen, a pivotally supported type carrying bar 27, provided with a plurality of type adapted to be presented to said platen, in combination with a hammer arranged to drive one of said type against said platen, a cam arranged to control the operation of said hammer, means for rotating said cam, and a lock arranged to hold said hammer out of control of said cam, substantially as described.

87. In a device of the kind described, a platen, pivotally supported type carrying bars 27, provided with a plurality of movable type arranged to be moved in contact with said platen, and means for oscillating the type carrying bar measured distances, in combination with a hammer arranged to set one of said type against the platen, a cam controlling the operation of said hammer, means for rotating said cam, a lock adapted to hold the hammer out of control of the cam, and means for automatically operating said lock, substantially as described.

88. In a device of the kind described, a platen, pivotally supported type carrying bar, provided with a plurality of type adapted to be set against the platen, a longitudinal movable bar 18 arranged to control the oscillation of the type carrying bar, and means for regulating the longitudinal movement of the bar 18, in combination with a hammer arranged to drive one of said type against the platen, a cam controlling the operation of said hammer, means for rotating said cam, a lock arranged to hold the hammer out of control of the cam, and means for operating said lock, substantially as described.

89. In a device of the kind described, a series of movable type a series of hammer for operating the type, each controlled by a rotatable cam, and means for rotating the said cam, in combination with a series of locks adapted to lock a hammer out of control of it the several locks being arranged and constructed that upon depressing a lock controlling one order of characters, the several locks of all inferior orders will also be released, substantially as described.

90. In a device of the kind described, the combination with a platen, of a type bar, a spring actuated hammer, a cam for retaining the hammer in a position out of engagement with the type and permitting its movement during part of its revolution, means for preventing the movement of the hammer after its release by the cam and means actuated by the type actuating means for releasing the preventing means so that the hammer can move against the type.

91. The combination with a platen of a pivoted type bar, a spring actuated hammer, a cam for preventing the movement of the hammer during part of its rotation and a lock for the hammer controlled by the movement of the type bar.

92. In a device of the kind described, a platen roller 119 provided with a ratchet 124, the oscillating lever 125, provided with a pawl 127, adapted to engage the ratchet 124, the operating lever 131 having one end extended to operate the oscillating lever 125 and the other to be carried by the cam 133, and means for rotating the said cam, in combination with the lever 137, adapted to throw the lever 131 out of engagement with the cam, and retain it in such position, and means for operating said lever 137, substantially as described.

93. In a device of the kind described, a type carrying bar 27, and means for oscillating the same, a hammer adapted to set the type, a cam adapted to control the hammer, and a lock 104, arranged to lock the hammer out of operative position, in combination with a lever 108, having one end extended to engage the lock 104, and a cam extension on the bars 27, adapted to engage and control the lever 108, substantially as described.

94. In a device of the kind described, the combination of a plurality of spring actuated hammers, cams for setting the hammers, hammer locks 104, each provided with an extension 117, adapted to engage the lock of the next lower order, and means for operating the locks, whereby upon depressing a lock of the higher order, all locks of a lower order will also be depressed, substantially as described.

95. In a device of the character described, the combination with oscillating indicating elements and means for actuating the same, of carrying mechanism comprising rocking holding means, spring actuated carrying levers 71, the cams for moving the same, and means on the holding means for preventing the movement of the lever 71.

96. A calculating machine, comprising calculating mechanism and printing mechanism, a relatively fixed key-board provided with a set of controlling keys common to both comprising a section of keys for each numerical order, intermediate connecting mechanism from the keys to the calculating and printing mechanism, and actuating means for the device in combination with intermediate controlling mechanism for rendering either the calculating or printing mechanism inoperative at will, permitting the independent operation of the other.

97. In a device of the kind described, a plurality of hammers 102, a plurality of cams 100, each coöperating with a hammer 102, in combination with dogs 104, each adapted to engage with and lock a hammer in its inoperative position, the movable type carrying-bars 27, each provided with a cam extension 111, said lever being arranged to normally engage the cam extension 111 and extended to depress the dogs 104 when the type carrying bar 27 is moved, substantially as described.

98. In a device of the kind described, a plurality of hammers 102, and cams 100, arranged to coöperate with said hammers, in combination with dogs 104 each provided with a lateral extension 117 adapted to engage with the dog controlling the next lower order, the bar 27 provided with a cam extension 111, and a pivoted lever 108, arranged to normally engage the cam, and extended to control the operation of the dogs, substantially as described.

99. The combination with indicating mechanism, printing mechanism and means for connecting the same for joint operation, of keys for controlling the indicating mechanisms, means for segregating the two said mechanisms respectively from the keys and from each other, said means being exposed for operation by the operator at will, and a carriage shiftable laterally relative to said printing mechanism, substantially as described.

100. In a device of the kind described, a plurality of movable lock bars 5, in combination with a shaft 174 having mounted thereon a plurality of oscillating levers 176, each adapted to engage with and longitudinally move one of said bars 5, a lever 178 also secured to said shaft, a cam making a complete revolution at each operation of the device, and means for transmitting the operation of the cam to the lever 178, substantially as described.

101. In a calculating machine, the combination with stops, setting up means comprising a fixed keyboard provided with a section of movable keys for each numerical order and coöperating mechanism therefor, of printing mechanism comprising movable type and hammers therefor, computing mechanism and shifting means for operatively associating the stops setting up mechanism as a whole, with the printing mechanism and with the computing mechanism for respectively independent operations.

102. In an adding machine, the combination with keys, of adding mechanism, means for actuating the same, means for positioning said actuating means in and out of position for operating the adding mechanism, a key for controlling said positioning means, and a printing mechanism with means associated with the keys for actuating the same.

103. In a calculating machine, the combination with key actuating mechanism, of a printing mechanism, an indicating mechanism, and means for separating respectfully at will the three mechanisms one from the other to permit the full back and forth actuation of the keys without disturbing the indicating and printing mechanisms.

104. In a calculating machine, the combination with a key mechanism, of an indicating mechanism normally out of operative connection with the key mechanism, and means for connecting the two mechanisms comprising complementary rack members movable one independent of the other, and pinions engaging the rack members.

105. In a device of the kind described, a longitudinally movable bar, means for regulating its limit of travel at will, means for moving said bar its limit, computing mechanism, and means for actuating said mechanism controlled by said bar, in combination with printing mechanism, means for actuating said mechanism also controlled by said bar, and means for disconnecting the printing mechanism from the controlling bar to permit the independent operation of the computing mechanism.

106. A calculating machine, comprising computing mechanism, printing mechanism, including movable type and hammers therefor, and a series of banks or rows of keys common to both the computing and printing mechanisms mounted upon a fixed portion of said machine, in combination with means for separating at will the two mechanisms to permit the actuating of one without operatively actuating the other.

DANIEL W. SHIEK.

Witnesses:
 JOHN W. HILL,
 CHARLES I. COBB.